(12) United States Patent
Beard et al.

(10) Patent No.: US 12,411,548 B2
(45) Date of Patent: Sep. 9, 2025

(54) VIBRATION-BASED LOCATION INDICATION SYSTEM

(71) Applicant: Dell Products L.P., Round Rock, TX (US)

(72) Inventors: Neal Beard, Austin, TX (US); Maunish Shah, Austin, TX (US); Bruce Anthony Holmes, Austin, TX (US); Douglas Roy Kaiser, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 142 days.

(21) Appl. No.: 18/502,206

(22) Filed: Nov. 6, 2023

(65) Prior Publication Data

US 2025/0076980 A1   Mar. 6, 2025

Related U.S. Application Data

(63) Continuation-in-part of application No. 18/461,051, filed on Sep. 5, 2023.

(51) Int. Cl.
  *G08B 1/08*   (2006.01)
  *G06F 3/01*   (2006.01)
(52) U.S. Cl.
  CPC .................................. *G06F 3/014* (2013.01)

(58) Field of Classification Search
  CPC . G08B 6/00; H04R 3/00; H04R 1/025; H04R 17/00; G06F 13/122
  See application file for complete search history.

(56) References Cited

U.S. PATENT DOCUMENTS

| | | | | |
|---|---|---|---|---|
| 5,969,256 A | * | 10/1999 | Hobbs | G01M 7/06 73/662 |
| 8,867,819 B2 | * | 10/2014 | Calio | G06V 20/10 382/153 |
| 2022/0020248 A1 | * | 1/2022 | Crisp | H05B 47/115 |

* cited by examiner

*Primary Examiner* — Toan N Pham
(74) *Attorney, Agent, or Firm* — Joseph Mencher

(57) ABSTRACT

A computing system locating system includes a computing system having a computing system light emitting device that is configured to emit light to provide a computing system locating signal, and a vibration-based location indication system. The vibration-based location indication system includes a light detection subsystem that is configured to detect the computing system locating signal via the light emitted from the computing system light emitting device on the computing system, and a vibration subsystem that is configured to vibrate. A location indication subsystem in the vibration-based location indication system that is coupled to the light detection subsystem and the vibration subsystem determines that the light detection subsystem has detected the computing system locating signal via the light emitted from the computing system light emitting device on the computing system and, in response, drives the vibration subsystem to produce a vibration to indicate the location of the computing system.

20 Claims, 40 Drawing Sheets

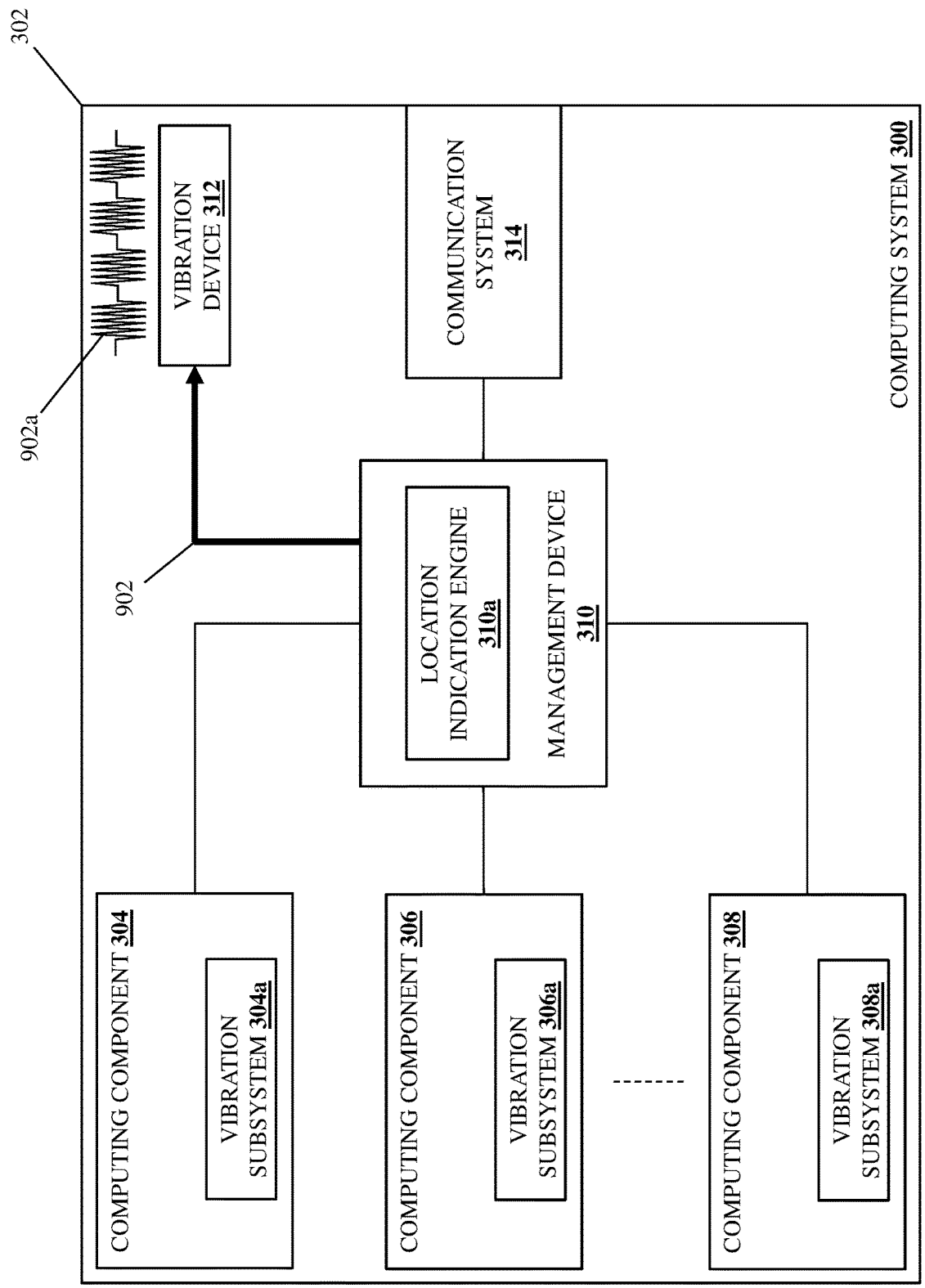

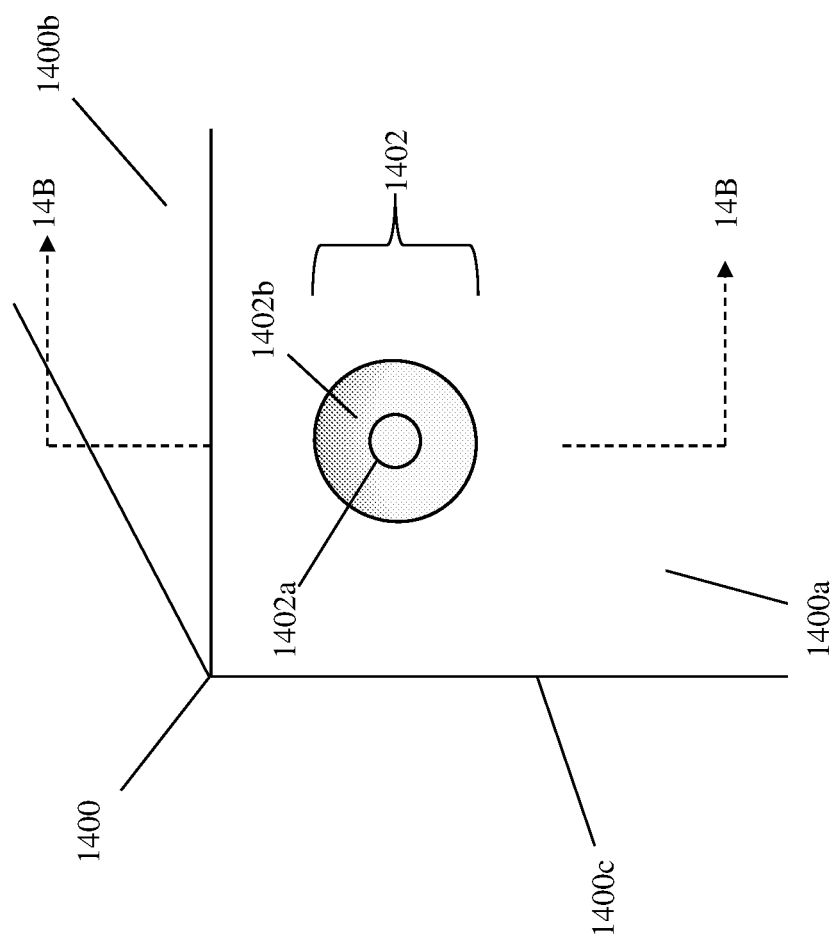

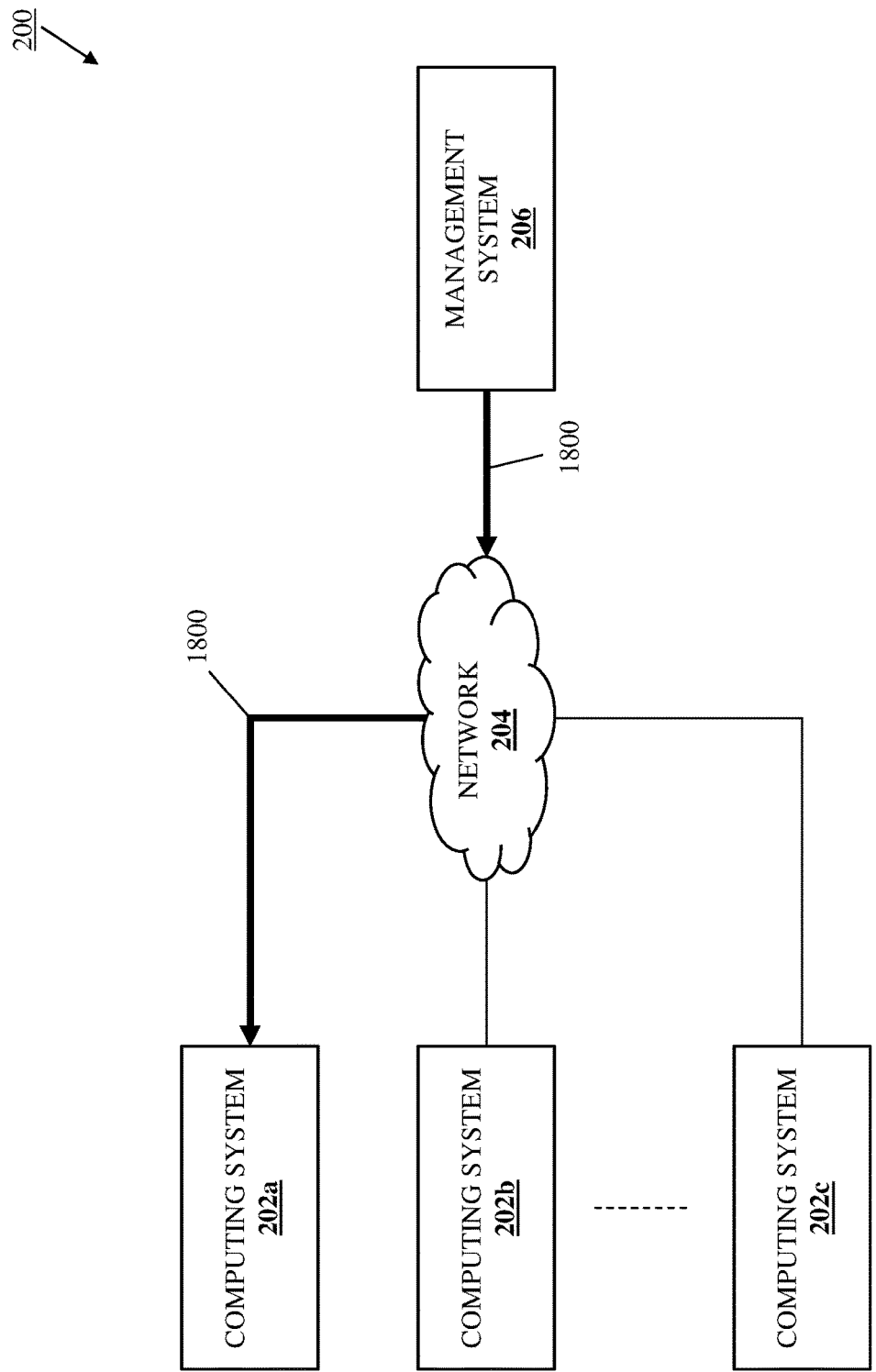

VIBRATION-BASED LOCATION INDICATION SYSTEM

CROSS-REFERENCE TO RELATED APPLICATION

This application is a continuation-in-part of U.S. patent application Ser. No. 18/461,051, filed Sep. 5, 2023, the disclosure of which is incorporated by reference herein in its entirety.

BACKGROUND

The present disclosure relates generally to information handling systems, and more particularly to using vibrations to indicate the location of information handling systems and/or information handling system components.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handlings systems such as, for example, server devices, switch devices, storage systems, and/or other computing devices known in the art sometimes must sometimes be located in order to, for example, service and/or replace those computing devices and/or their computing component that are experiencing issues. As will be appreciated by one of skill in the art in possession of the present disclosure, the locating of such computing devices is difficult due to those computing devices often being located amongst many other computing devices (e.g., in racks in a datacenter). Conventional solutions to such issues include providing a Light Emitting Device (LED) on the computing device and causing that LED to "blink" when that computing device must be located, which allows a datacenter technician to locate that computing device by visually identifying the blinking LED. However, such visual indications of the location of computing devices raise several issues.

For example, blind and/or otherwise visually impaired datacenter technicians cannot identify the blinking LEDs discussed above, and thus conventional solutions prevent or limit the ability of people with visual impairments from performing the computing device servicing or replacement described above. Furthermore, even when a datacenter technician does not have a visual impairment that prevents them from identifying the blinking LEDs described above, those blinking LEDs can be obscured by other computing devices, racks, cabling, and/or other datacenter components, or may simply not be in the line-of-sight of the datacenter technician, requiring the datacenter technician to search for the blinking LED in order to locate the computing device they are attempting to service or replace. Further still, even when the blinking LEDs discussed above are not obscured and are in the line-of-sight of the datacenter technician, there are often many LEDs in a datacenter that may be blinking for reasons other than providing a visual indication the location of their computing device, which can result in the datacenter technician identifying an incorrect computing device for servicing or replacement.

Accordingly, it would be desirable to provide a computing device location indication system that addresses the issues discussed above.

SUMMARY

According to one embodiment, a vibration-based location indication system includes a light detection subsystem that is configured to detect a computing system locating signal via light emitted from a computing system light emitting device included on a computing system; a vibration subsystem that is configured to vibrate; a processing system that is coupled to the light detection subsystem and the vibration subsystem; and a memory system that is coupled to the processing system and that includes instructions that, when executed by the processing system, cause the processing system to provide a location indication engine is configured to: determine that the light detection subsystem has detected the computing system locating signal via the light emitted from the computing system light emitting device included on the computing system; and drive, in response to determining that the light detection subsystem has detected the computing system locating signal, the vibration subsystem to produce a vibration that is configured to indicate the location of the computing system.

BRIEF DESCRIPTION OF THE DRAWINGS

FIG. 9B is a schematic view illustrating an embodiment of the computing system of FIG. 3 operating during the method of FIG. 5.

FIG. 14A is a perspective view illustrating an embodiment of a LED subsystem on the computing system of FIG. 12.

FIG. 18A is a schematic view illustrating an embodiment of the networked system of FIG. 2 operating during the method of FIG. 17.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
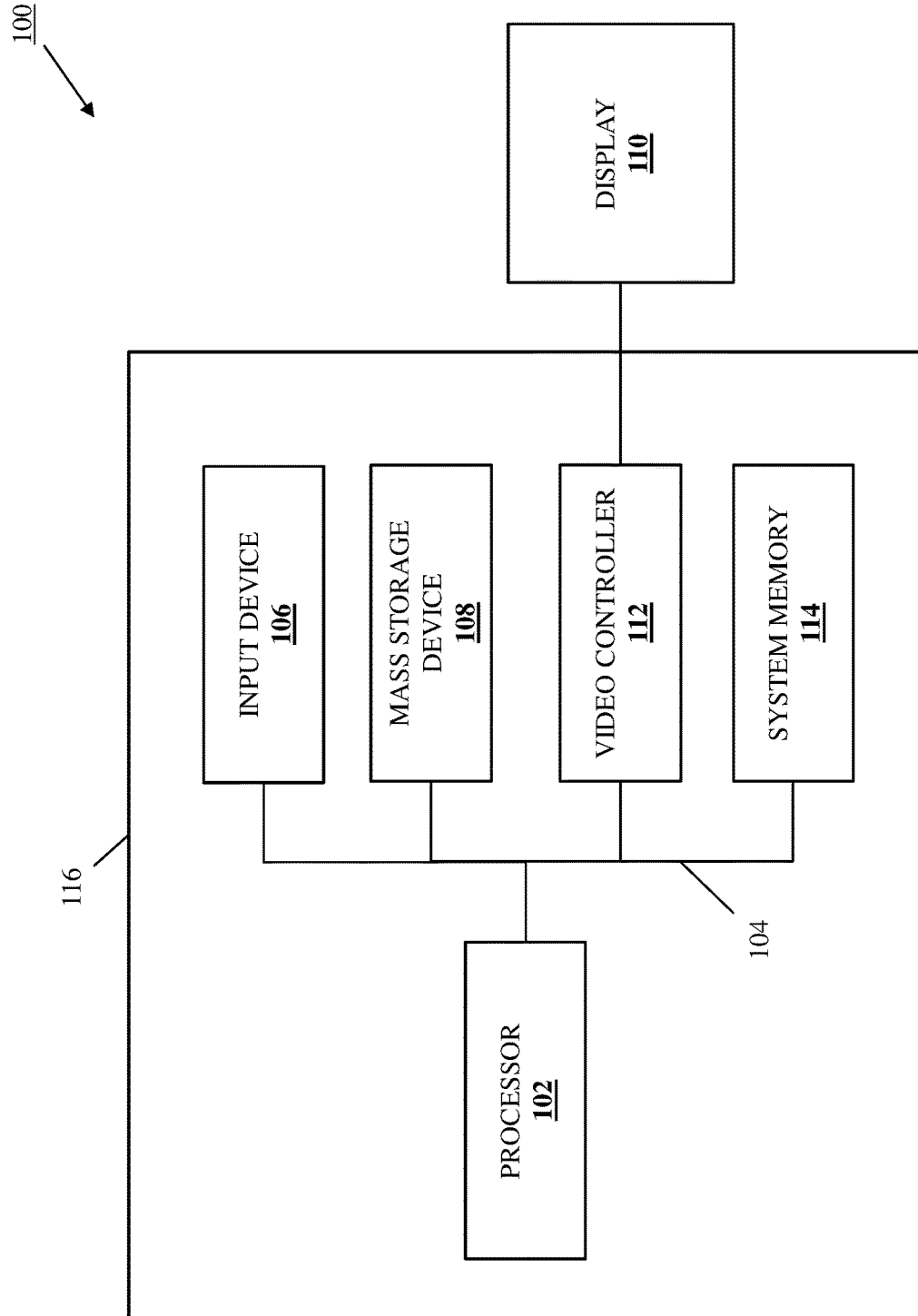
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
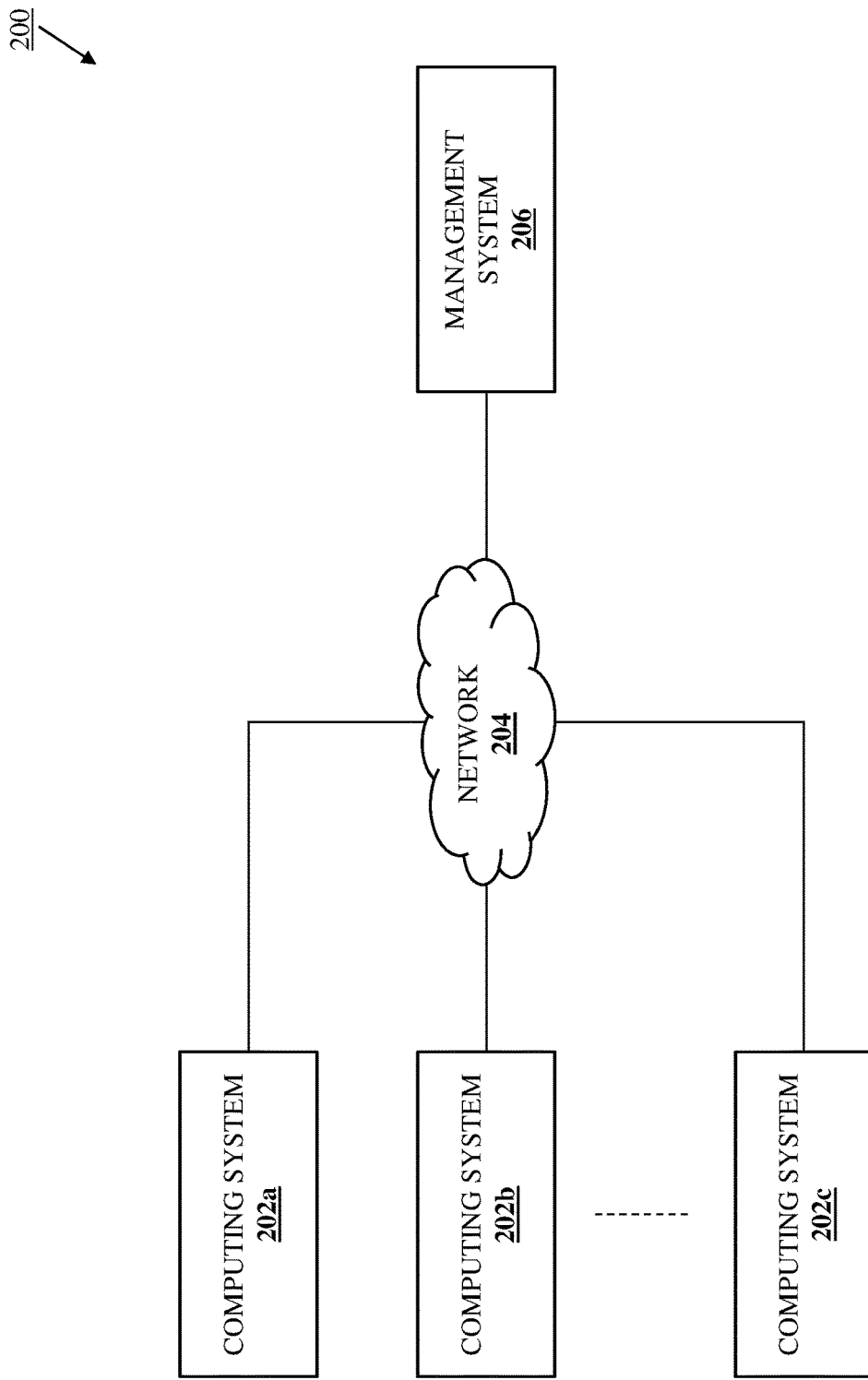
FIG. 2 is a schematic view illustrating an embodiment of a networked system that may provide the vibration-based location indication system of the present disclosure.

Referring now to FIG. 2, an embodiment of a networked system 200 is illustrated that may provide the vibration-based location indication system of the present disclosure. In a specific example, the networked system 200 may be provided by a datacenter, although one of skill in the art in possession of the present disclosure will appreciate how the network system 200 may be provided in a variety of other implementations while remaining within the scope of the present disclosure as well. In the illustrated embodiment, the networked system 200 includes a plurality of computing systems 202a, 202b, and up to 202c. In an embodiment, any or each of the computing systems 202a-202c may be provided by the IHS 100 discussed above with reference to FIG. 1, and/or may include some or all of the components of the IHS 100, and in specific examples may be provided by server devices, switch devices, storage systems, and/or other datacenter computing systems that would be apparent to one of skill in the art in possession of the present disclosure. However, while illustrated and discussed as being provided by particular datacenter computing systems, one of skill in the art in possession of the present disclosure will recognize that computing systems provided in the networked system 200 may include any computing systems that may be configured to operate similarly as the computing systems 202a-202c discussed below.

As illustrated, in some embodiments each of the computing systems 202a-202c may be coupled to a management system 206 via a network 204 that may be provided by a Local Area Network (LAN), the Internet, combinations thereof, and/or any other networks that would be apparent to one of skill in the art in possession of the present disclosure. In an embodiment, the management system 206 may be provided by the IHS 100 discussed above with reference to FIG. 1, and/or may include some or all of the components of the IHS 100, and in specific examples may be provided by a desktop computing device, a laptop/notebook computing device, a tablet computing device, a mobile phone, one or more server devices, and/or any other management system components that would be apparent to one of skill in the art in possession of the present disclosure.

However, while illustrated and discussed as being provided by particular management systems, one of skill in the art in possession of the present disclosure will recognize that management systems provided in the networked system 200 may include any management systems that may be configured to operate similarly as the management system 206 discussed below. Furthermore, while a specific networked system 200 has been illustrated and described, one of skill in the art in possession of the present disclosure will recognize that the networked system of the present disclosure may include a variety of components and component configurations for providing conventional networked system functionality, as well as the vibration-based location indication functionality discussed below, while remaining within the scope of the present disclosure as well.

Figure 3:
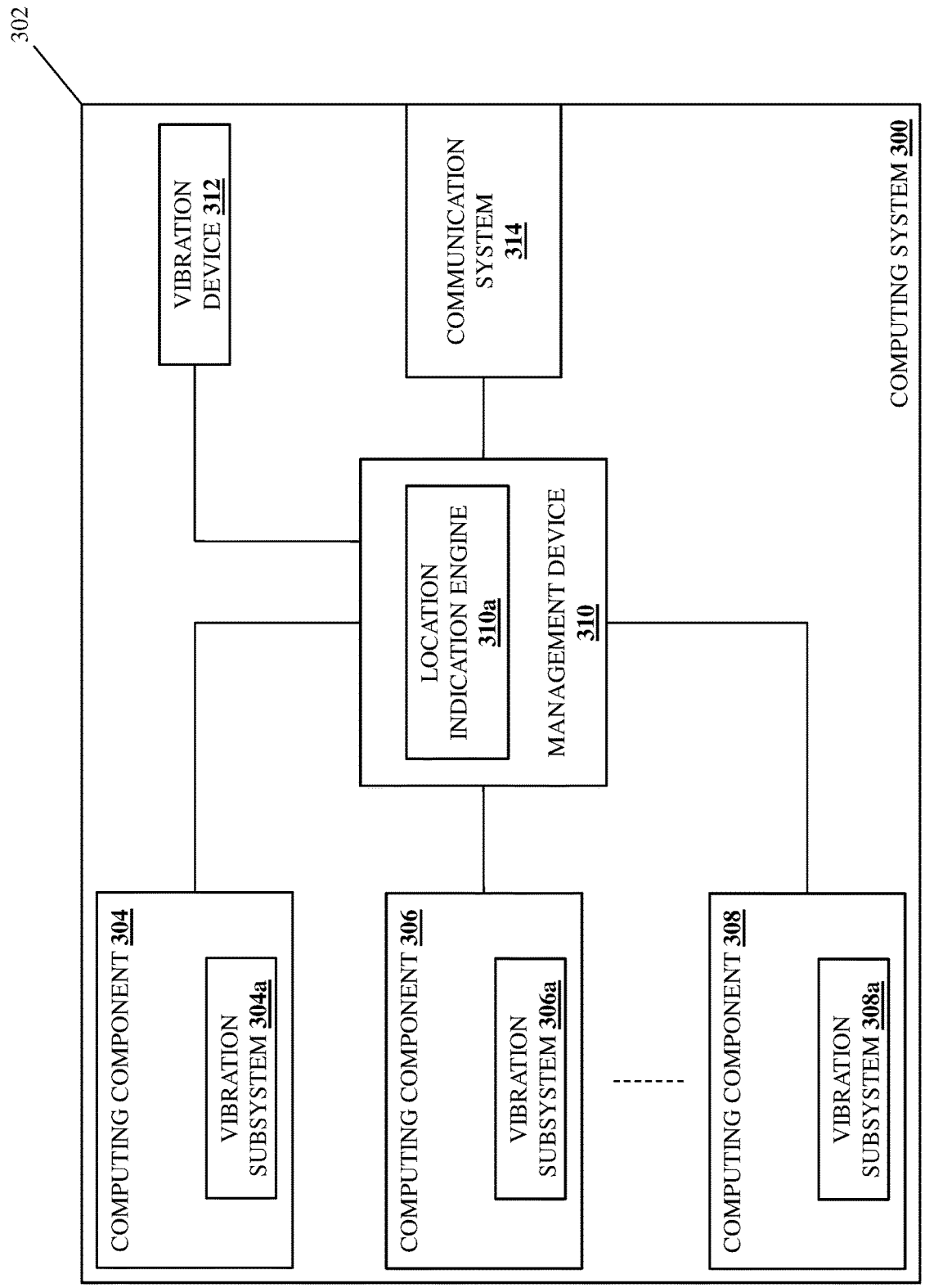
FIG. 3 is a schematic view illustrating an embodiment of a computing system that may provide the vibration-based location indication system of the present disclosure.

Referring now to FIG. 3, an embodiment of a computing system 300 is illustrated that may provide the vibration-based location indication system of the present disclosure, and/or may provide any or all of the computing systems 202a-202c in the networked system 200 discussed above with reference to FIG. 2. As such, the computing system 300 may be provided by the IHS 100 discussed above with reference to FIG. 1 and/or may include some or all of the components of the IHS 100, and in specific examples may be provided by server devices, switch devices, storage systems, and/or other datacenter computing systems that would be apparent to one of skill in the art in possession of the present disclosure. However, while illustrated and discussed as being provided by a datacenter computing system, one of skill in the art in possession of the present disclosure will recognize that the computing system 300 may be provided by any computing systems that may be configured to operate similarly as the computing system 300 discussed below.

In the illustrated embodiment, the computing system 300 includes a chassis 302 that houses the components of the computing system 300, only some of which are illustrated and discussed below. For example, in the illustrated embodiment, the chassis 302 houses a plurality of computing components 304, 306, and up to 308. In an embodiment, any or all of the computing components 304-308 may be provided by components of the IHS 100 discussed above with reference to FIG. 1, and in the specific examples below are described as being provided by storage devices, Power Supply Units (PSU) devices, fan systems, other Field Replaceable Unit (FRU) devices, and/or any other computing component that would be apparent to one of skill in the art in possession of the present disclosure.

As illustrated in FIG. 3, each of the computing components 304, 306, and up to 308 may include a respective vibration subsystem 304a, 306a, and up to 308a. As described in further detail below, in some embodiments each of the vibration subsystems 304a-308a may include a dedicated vibration device that may be provided by any of a variety of vibration motors that one of skill in the art in possession of the present disclosure would recognize as providing the vibration-based location indication functionality described below. However, as also described in further detail below, in other embodiments the vibration device in each of the vibration subsystems 304a-308a in the respective computing components 304-308 may be provided by at least one computing component subsystem in that computing component that is configured to operate to provide at least one computing component function that is unrelated to vibration-based location indication functionality described, and that is configured to produce vibrations in response to operating. For example, such a computing component subsystem may be provided by a hard disk in a Hard Disk Drive (HDD) storage device that may vibrate in response to spinning to allow data to be read from the hard disk, a fan in a fan system that may vibrate in response to rotating to produce an airflow, and/or any other vibration-producing computing system component that one of skill in the art in possession of the present disclosure would recognize as providing the vibrations as part of their operations as described below.

In the illustrated embodiment, the chassis 302 also houses a management device 310 that is coupled to each of the computing components 304-308. In an embodiment, the management device 310 may be provided by the IHS 100 discussed above with reference to FIG. 1 and/or may include some or all of the components of the IHS 100, and in specific examples may be provided by a Baseboard Management Controller (BMC) device such as the integrated DELL® Remote Access Controller (iDRAC) device available in server devices provided by DELL®, Inc. of Round Rock, Texas, United States, as well as any other management devices that would be apparent to one of skill in the art in possession of the present disclosure. As such, the management device 310 may provide an Out-Of-Band (OOB) management platform on the computing system 300 that includes resources that are mostly separate from the resources of the computing system 300, and that may provide a browser-based and/or Command Line Interface (CLI) for managing and monitoring of hardware and/or software in the computing system 300, as well as performing any of the functionality described below. However, while illustrated and discussed as being provided by a particular management device, one of skill in the art in possession of the present disclosure will recognize that the management device 310 may be provided by any management device that may be configured to operate similarly as the management device 310 discussed below.

In the embodiments illustrated and described below, the management device 310 may include a management processing system (not illustrated, but which may be similar to the processor 102 discussed above with reference to FIG. 1) and a management memory system (not illustrated, but which may be similar to the memory 114 discussed above with reference to FIG. 1) that is coupled to the management processing system and that includes instructions that, when executed by the management processing system, cause the management processing system to provide a location indication engine 310a that is configured to perform the functionality of the location indication engines, location indication subsystems, and/or computing systems discussed below. As will be appreciated by one of skill in the art in possession of the present disclosure, the location indication engine 310a may be coupled to each of the computing components 304-308 via, for example, a coupling between the management processing system and the computing components 304-308.

The chassis 302 may also house a vibration device 312 that is coupled to the location indication engine 310a in the management device 310 (e.g., via a coupling between the management processing system and the vibration device 312). In some embodiments, the vibration device 312 may include a dedicated vibration device that may be provided by any of a variety of vibration motors that one of skill in the art in possession of the present disclosure would recognize as providing the vibration-based location indication functionality described below. However, in other embodiments, the vibration device 312 may be provided by at least one computing system subsystem in the computing system 300 that is configured to operate to provide at least one computing system function that is unrelated to vibration-based location indication functionality described, and that is configured to produce vibrations in response to operating. As such, similarly as described above, the computing system subsystem that provides the vibration device 312 may include a hard disk in an HDD storage device that may vibrate in response to spinning to allow data to be read from the hard disk, a fan in a fan system that may vibrate in response to rotating to produce an airflow, and/or any other vibration-producing computing system subsystem that one of skill in the art in possession of the present disclosure would recognize as providing the vibrations as part of their operations as described below.

The chassis 302 may also house a communication system 314 that is coupled to the location indication engine 310a (e.g., via a coupling between the communication system 308 and the management processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing system 300 has been illustrated and described, one of skill in the art in possession of the present disclosure will recognize that computing systems may include a variety of components and/or component configurations for providing conventional computing system functionality, as well as the vibration-based location indication functionality discussed below, while remaining within the scope of the present disclosure as well.

Figure 4:
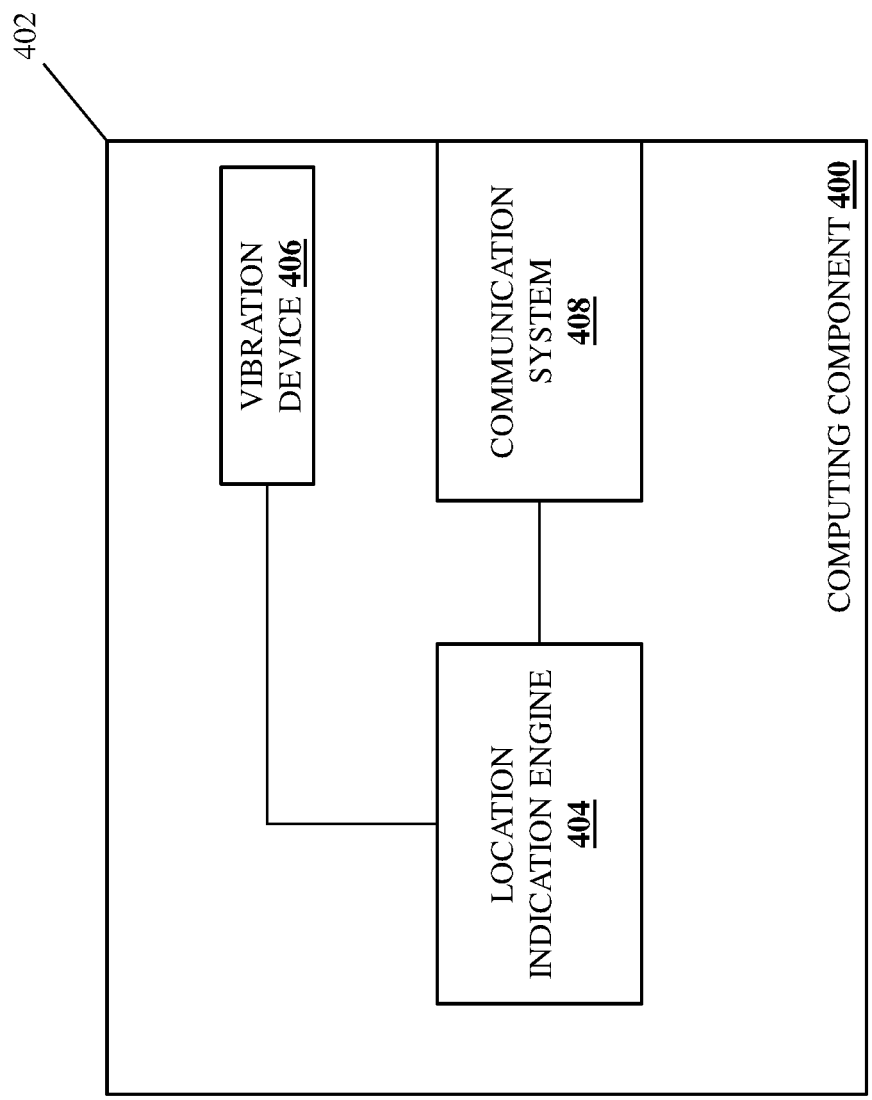
FIG. 4 is a schematic view illustrating an embodiment of a computing component that may provide the vibration-based location indication system of the present disclosure.

Referring now to FIG. 4, an embodiment of a computing component 400 is illustrated that may provide the vibration-based location indication system of the present disclosure, and/or may provide any or all of the computing components 304-308 discussed above with reference to FIG. 3. As such, the computing component 400 may provide a component in the IHS 100 discussed above with reference to FIG. 1, and in specific examples may be provided by storage devices, Power Supply Units (PSU) devices, fan systems, other Field Replaceable Unit (FRU) devices, and/or any other computing component that would be apparent to one of skill in the art in possession of the present disclosure. However, while illustrated and discussed as being provided by particular computing components, one of skill in the art in possession of the present disclosure will recognize that the computing component 400 may be provided by any computing components that may be configured to operate similarly as the computing component 400 discussed below.

In the illustrated embodiment, the computing component 400 includes a chassis 402 that houses the components of the computing component 400, only some of which are illustrated and discussed below. For example, in the illustrated embodiment, the chassis 402 may house a component processing system (not illustrated, but which may be similar to the processor 102 discussed above with reference to FIG. 1 and may be provided by a component controller, component microcontroller, and/or other component processor that would be apparent to one of skill in the art in possession of the present disclosure) and a component memory system (not illustrated, but which may be similar to the memory 114 discussed above with reference to FIG. 1 and may be provided by a component controller, component microcontroller, and/or other component memory that would be apparent to one of skill in the art in possession of the present disclosure) that is coupled to the component processing system and that includes instructions that, when executed by the component processing system, cause the component processing system to provide a location indication engine 404 that is configured to perform the functionality of the location indication engines, location indication subsystems, and/or computing components discussed below.

The chassis 402 may also house a vibration device 406 that is coupled to the location indication engine 404 (e.g., via a coupling between the component processing system and the vibration device 406). In some embodiments, the vibration device 406 may include a dedicated vibration device that may be provided by any of a variety of vibration motors that one of skill in the art in possession of the present disclosure would recognize as providing the vibration-based location indication functionality described below. However, in other embodiments, the vibration device 406 may be provided by at least one computing component subsystem in the computing component 400 that is configured to operate to provide at least one computing component function that is unrelated to vibration-based location indication functionality described, and that is configured to produce vibrations in response to operating. As such, similarly as described above, a computing component subsystem that provides the vibration device 406 may include a hard disk in an HDD storage device that may vibrate in response to spinning to allow data to be read from the hard disk, a fan in a fan system that may vibrate in response to rotating to produce an airflow, and/or any other vibration-producing computing component subsystem that one of skill in the art in possession of the present disclosure would recognize as providing the vibrations as part of their operations as described below.

The chassis 402 may also house a communication system 408 that is coupled to the location indication engine 404 (e.g., via a coupling between the communication system 308 and the component processing system) and that may be provided by any computing component communication devices that would be apparent to one of skill in the art in possession of the present disclosure. However, while a specific computing component 400 has been illustrated and described, one of skill in the art in possession of the present disclosure will recognize that computing components may include a variety of component subsystems and/or component subsystem configurations for providing conventional computing component functionality, as well as the vibration-based location indication functionality discussed below, while remaining within the scope of the present disclosure as well.

Figure 5:
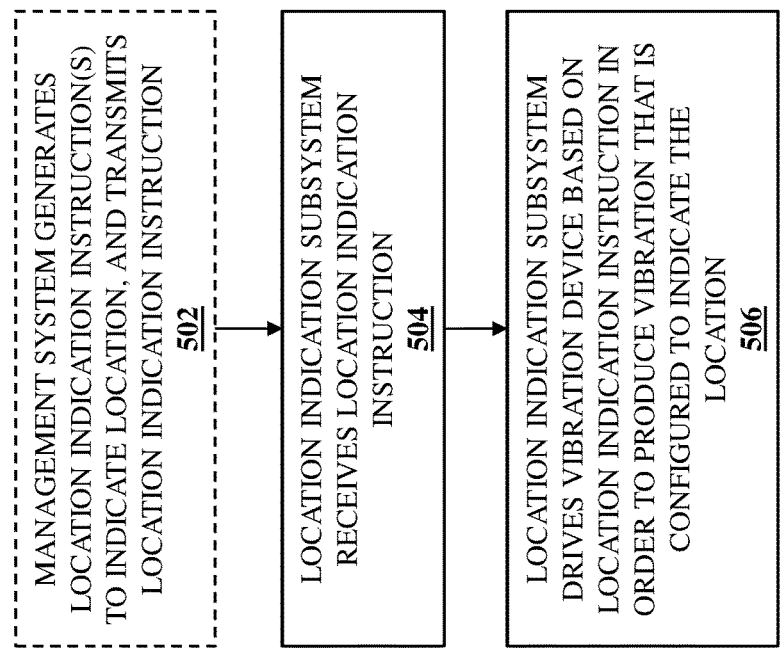
FIG. 5 is a flow chart illustrating an embodiment of a method for indicating a location of a computing system or computing component using vibrations.

Referring now to FIG. 5, an embodiment of a method 500 for indicating a location of a computing system or computing device using vibrations is illustrated. As discussed below, the systems and methods of the present disclosure provide for the indication of a location of a computing system or a computing component by vibrating a vibration device included in that computing system or that computing component. For example, the vibration-based location indication system of the present disclosure may include a computing system that is coupled to a management system via a network. The computing system includes a computing system vibration device, and a computing system location indication subsystem that is coupled to the network and the computing system vibration device. The computing system location indication subsystem receives a computing system location indication instruction to indicate a location of the computing system from the management system via the network and, based on the computing system location indication instruction, drives the computing system vibration device to produce a vibration that is configured to indicate the location of the computing system. As such, the issues with conventional visual location indications discussed above are remedied, allowing blind or visually impaired datacenter technicians to locate computing systems and computing components in datacenters, and assisting datacenter technicians with no visual impairments in locating computing systems and computing components in datacenters as well.

Figure 6:
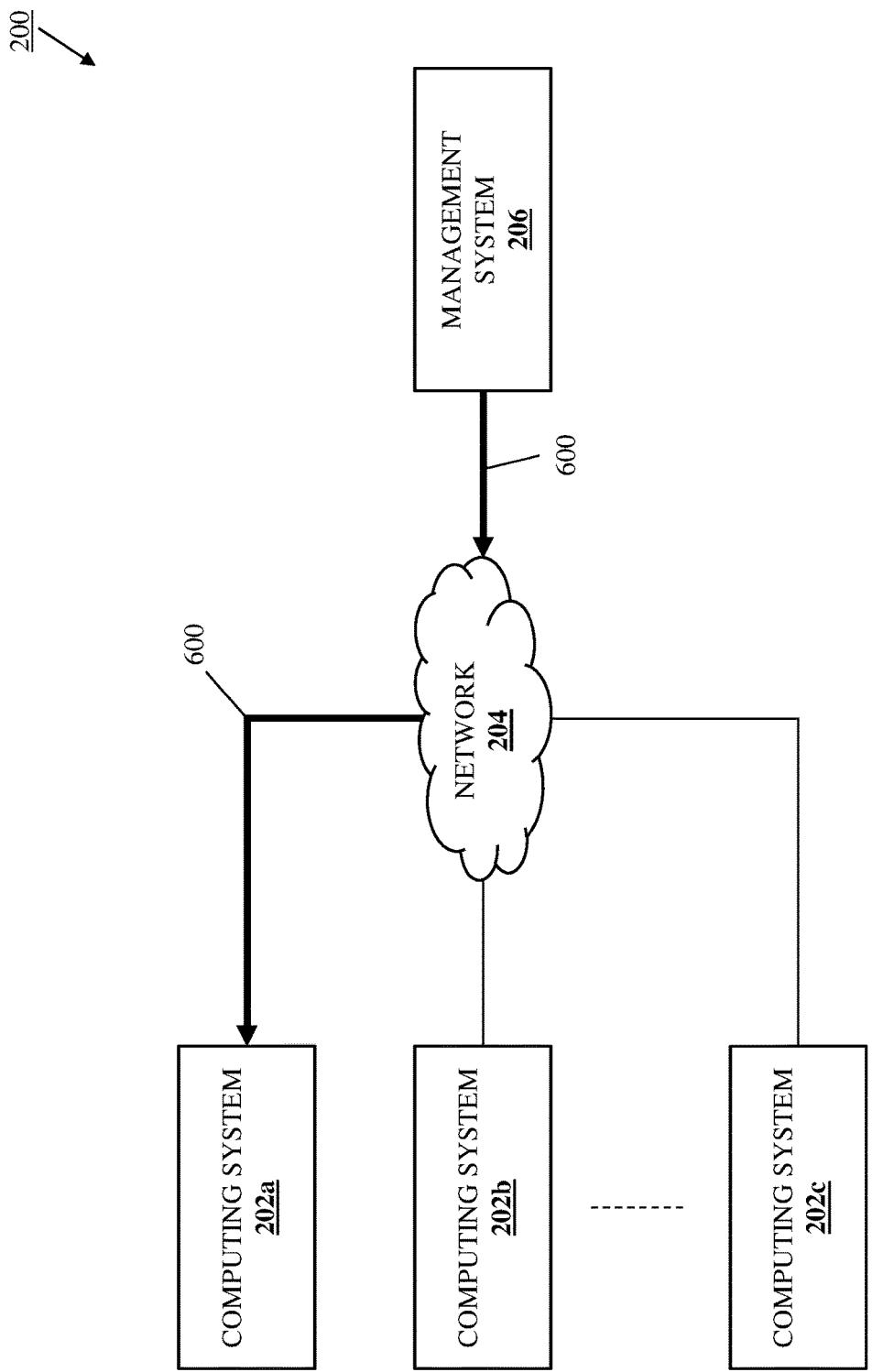
FIG. 6 is a schematic view illustrating an embodiment of the networked system of FIG. 2 operating during the method of FIG. 5.

The method 500 may begin at optional block 502 where a management system generates at least one location indication instruction to indicate a location, and transmits the location indication instruction. In the specific embodiment of block 502 illustrated in FIG. 6 and in many of the examples provided below, the management system 206 may perform location indication instruction provisioning operations 600 that may include generating at least one location indication instruction, and transmitting the location indication instruction(s) to via the network 204 to the computing system 202a. However, while the location indication instruction is illustrated and described in many of the examples below as being provided to the computing system 202a, one of skill in the art in possession of the present disclosure will appreciate how location indication instructions may be provided to any of the computing systems 202b-202c in a similar manner while remaining within the scope of the present disclosure as well.

To provide a specific example, the management system 206 may be configured to operate (e.g., with the management device 310 in any of the computing systems 202a-202c/300) to provide a management user interface that is provided for display to a network administrator or other user of the management system 206, and that allows the network administrator or other user to generate and transmit the location indication instruction(s) to the computing systems 202a-202c/300 and/or their computing component(s) 304-308 to indicate their respective location. For example, the management user interface may allow the network administrator or other user to select any of the computing systems 202a-202c/300 and/or their computing components 304-308, and then apply a "tactile" location indication instruction to the selected computing systems/computing components that, as discussed below, will cause the vibration device(s) in those computing systems and/or computing components to vibrate in order to indicate their location. Furthermore, the management user interface may also allow the user to select and apply a "visual" indication instruction to the selected computing systems/computing components that one of skill in the art in possession of the present disclosure will appreciate may cause Light Emitting Device(s) (LED(s)) in those computing systems and/or computing components (not illustrated or discussed below) to illuminate in order to indicate their location, as well as to apply a combined "tactile/vibration" indication instruction to the selected computing systems/computing components that will cause vibration device(s) and LED(s) in those computing systems and/or computing components to vibrate/illuminate in order to indicate their location.

However, while a specific example of the generation of location indication instructions via a management system has been described, one of skill in the art in possession of the present disclosure will appreciate how the location indication instructions provided according to the teachings of the present disclosure may be generated in a variety of manners and using a variety of techniques that will fall within the scope of the present disclosure as well. For example, and as discussed below, in some embodiments optional block 502 may be skipped and the location indication instructions provided according to the teachings of the present disclosure may be generated by the computing systems and/or computing components of the present disclosure while remaining within the scope of the present disclosure as well.

Figure 7:
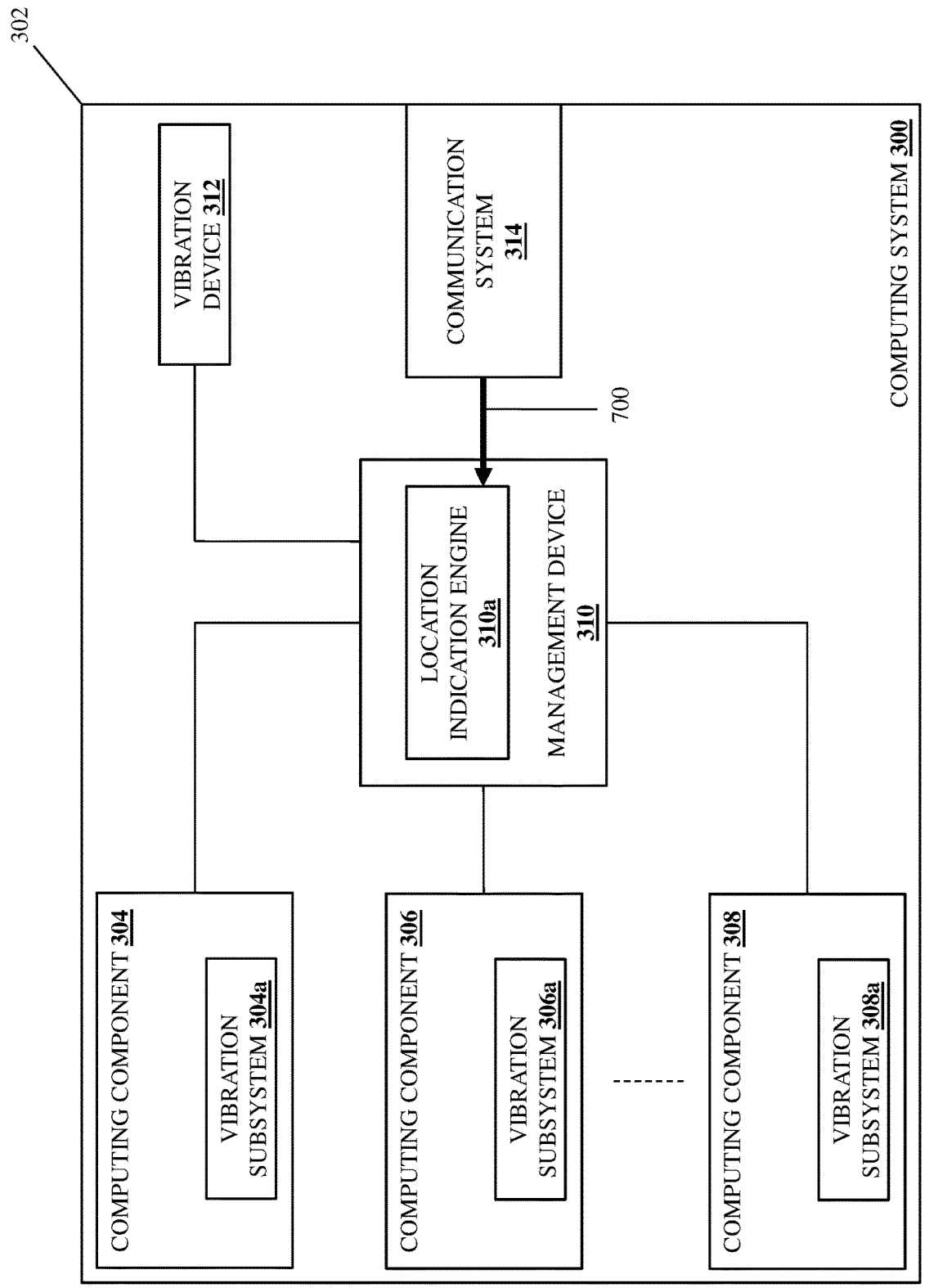
FIG. 7 is a schematic view illustrating an embodiment of the computing system of FIG. 3 operating during the method of FIG. 5.

The method 500 then proceeds to block 504 where a location indication subsystem receives the location indication instruction. With reference to FIG. 7, in some embodiments of block 504, the location indication engine 310a in the management device 310 included in the computing system 202a/300 may perform location indication instruction receiving operations 700 that include receiving the location indication instruction, which was generated and transmitted by the management system 206 at optional block 502, via its communication system 314.

Figure 8A:
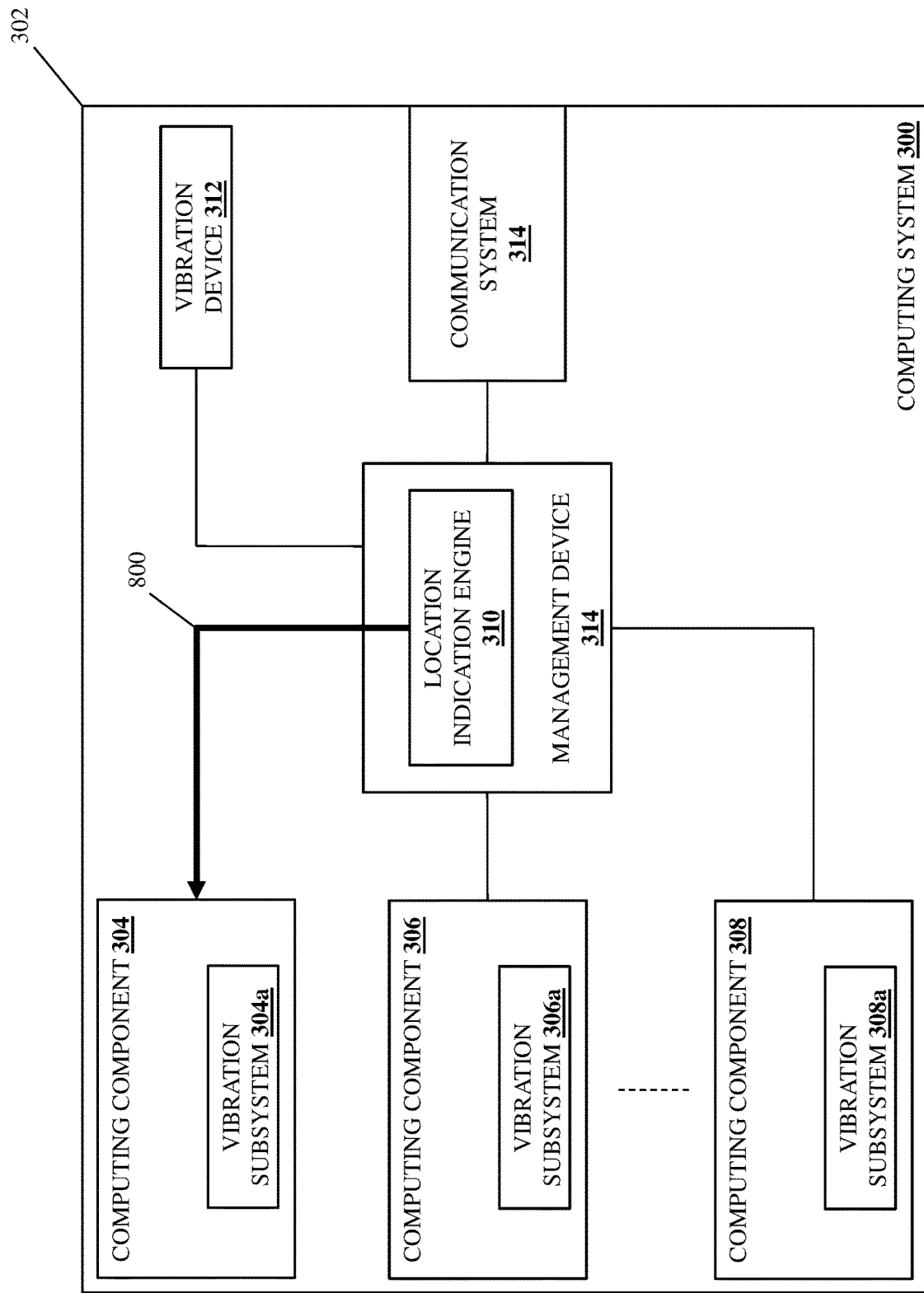
FIG. 8A is a schematic view illustrating an embodiment of the computing system of FIG. 3 operating during the method of FIG. 5.
Figure 8B:
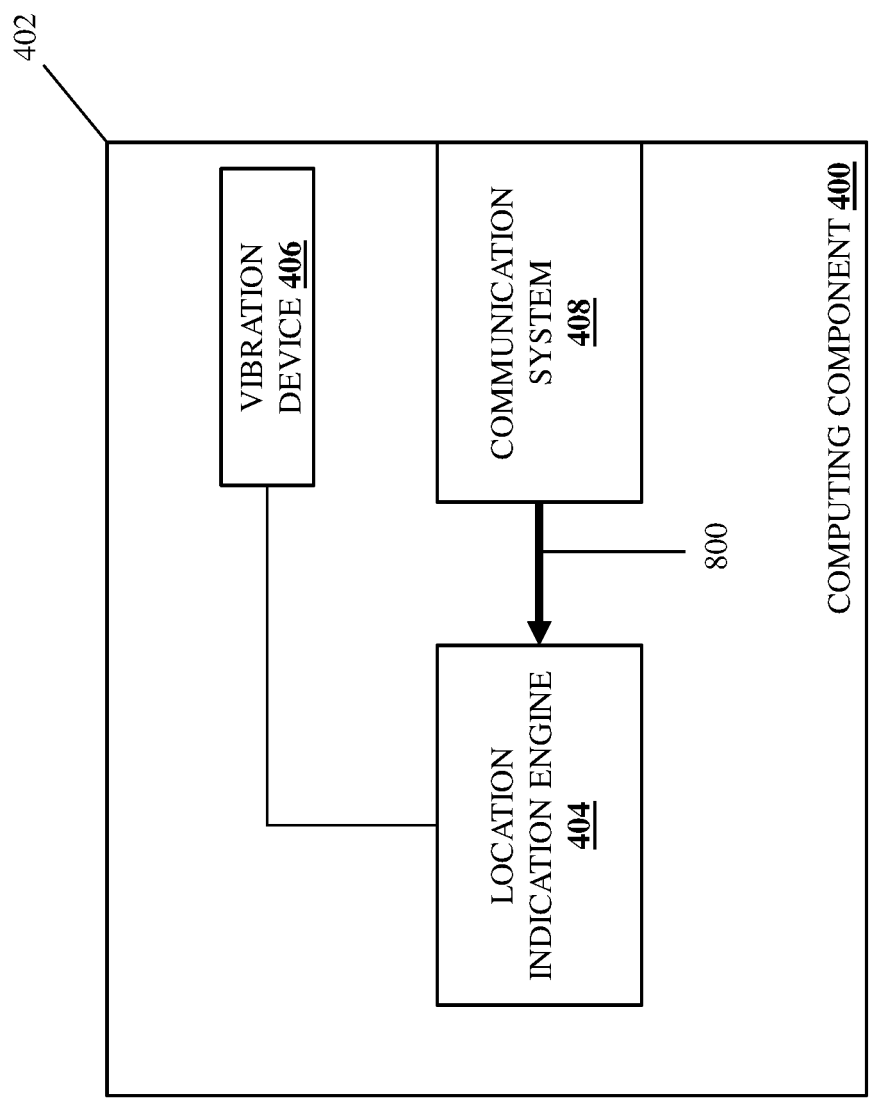
FIG. 8B is a schematic view illustrating an embodiment of the computing component of FIG. 4 operating during the method of FIG. 5.

With reference to FIGS. 8A and 8B, in some embodiments of block 504, the location indication engine 310a in the management device 310 included in the computing systems 202a/300 may perform location indication instruction forwarding operations 800 that include forwarding the location indication instruction, which was received from the management system 206, to the location indication engine 404 in the computing component 304/400 via its communication system 408. For example, FIGS. 7, 8A and 8B may illustrate an embodiment in which the location indication instruction is a computing component location indication instruction from the management system 206 that instructs the indication of a location of the computing component 304. However, while the computing component location indication instruction is illustrated and described as being provided to the computing component 304, one of skill in the art in possession of the present disclosure will appreciate how computing component location indication instructions may be provided to any of the computing components 304-308 in a similar manner while remaining within the scope of the present disclosure as well.

Furthermore, as discussed above, in some embodiments optional block 502 may be skipped, and the location indication instructions provided according to the teachings of the present disclosure may be generated by the management device 310 included in the computing system 202a/300. For example, in such embodiments, the management device 310 (e.g., a monitoring engine included therein) may be configured to monitor a health status, operating status, lifecycle status, and/or other characteristics of the computing system 202a/300 or its computing components 304-308 and, in response to detecting any issues (e.g., failures, imminent failures, faults, operation anomalies, lifecycle dates, etc.), may generate the location indication instruction that is "received" by the location indication engine 310a in the management device 310 at block 504. For example, such embodiments may include the management device 310 in the computing system 202a/300 generating a computing system location indication instruction that is configured to indicate the location of the computing system 202a/300 in response to detecting an issue with the computing system 202a/300 and/or one of its computing components 304-308.

However, one of skill in the art in possession of the present disclosure will also appreciate how the management device 310 in the computing system 202a/300 may generate a computing component location indication instruction that is configured to indicate the location of the computing component 304 in the computing system 202a/300 in response to detecting an issue with that computing component 304, and then may transmit that computing component location indication instruction to the location indication engine 404 in the computing component 304/400 similarly as illustrated and described above with reference to FIGS. 8A and 8B.

Further still, in embodiments in which optional block 502 is skipped, the location indication instructions provided according to the teachings of the present disclosure may be generated by the location indication engine 404 in the computing component 304/400 included in the computing system 202a/300. For example, in such embodiments, the location indication engine 404 in the computing component 304/400 (or a monitoring engine connected thereto) may be configured to monitor the health status, operating status, lifecycle status, and/or other characteristics of the computing component 304 and/or its computing components subsystems and, in response to detecting any issues (e.g., failures, imminent failures, faults, operation anomalies, lifecycle dates, etc.), may generate the location indication instruction that is "received" by the location indication engine 404 in the computing component 304/400 at block 504. For example, such embodiments may include the location indication engine 404 in the computing component 304/400 of the computing system 202a/300 generating a computing component location indication instruction that is configured to indicate the location of the computing component 304/400 in response to detecting an issue with that computing component 304/400.

Figure 9A:
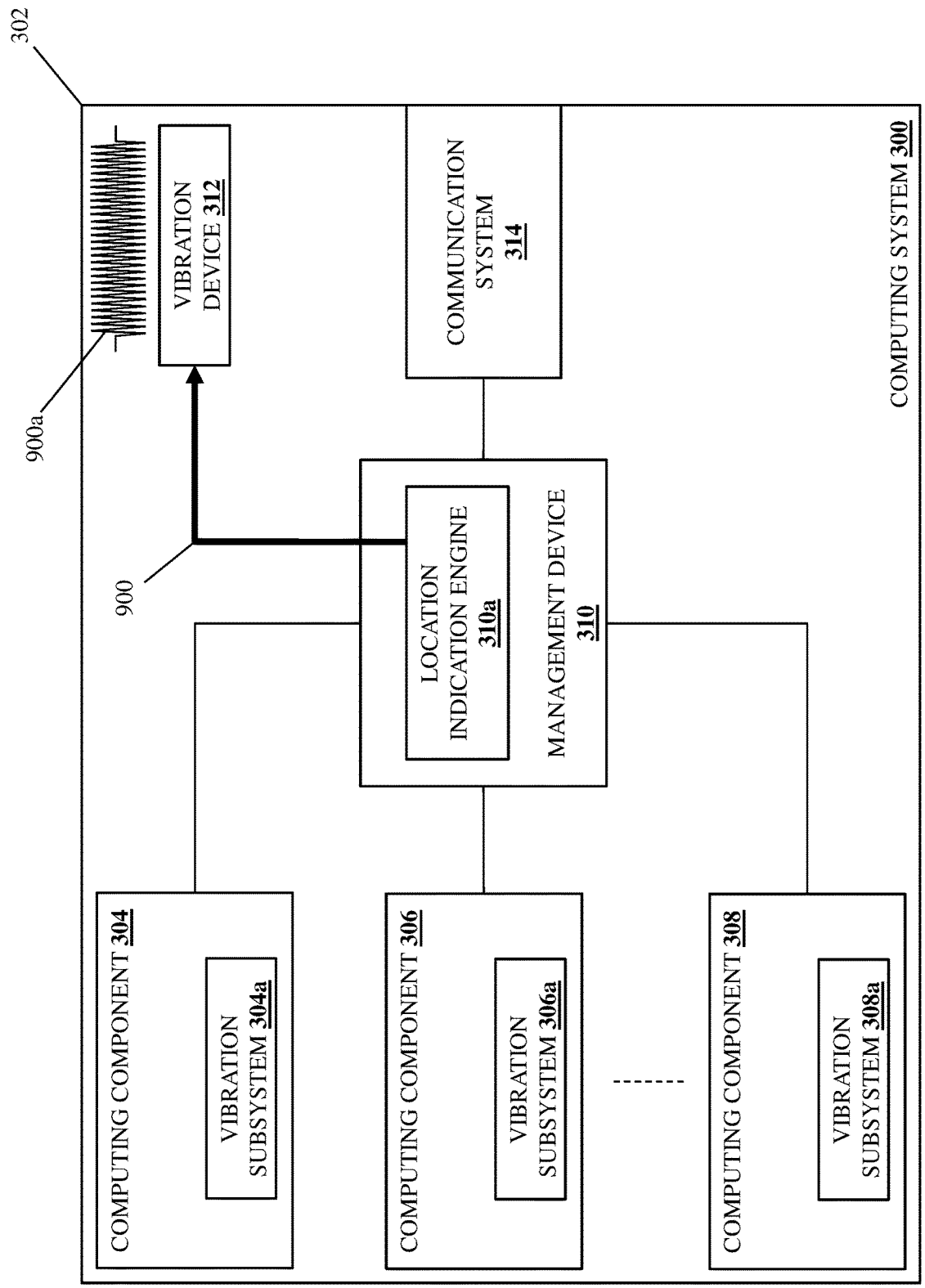
FIG. 9A is a schematic view illustrating an embodiment of the computing system of FIG. 3 operating during the method of FIG. 5.

The method 500 then proceeds to block 506 where the location indication subsystem drives a vibration device based on the location indication instruction in order to produce a vibration that is configured to indicate a location. With reference to FIG. 9A, in an embodiment of block 506, the location indication engine 310a in the management device 310 of the computing system 202a/300 may perform vibration-based location indication operations 900 that include driving the vibration device 312 to produce a vibration 900a based on the location indication instruction received at block 504. In a specific example in which the location indication instruction is a computing system location indication instruction (received from the management system 206 or generated by the management device 310) that instructs the indication of a location of the computing system 300, the vibration-based location indication operations 900 may be performed by the location indication engine 310a to drive the vibration device 312 to produce the vibration 900a that, in the illustrated example, includes a relatively long vibration period that is configured to indicate the location of the computing system 300.

To provide a specific example, the vibration-based location indication operations 900 may be configured to indicate the location of the computing system 202a/300 using vibration-based morse code that provides a vibration morse code "dash" for the computing system 202a/300, an example of which is illustrated by the vibration 900a in FIG. 9A. As such, a datacenter technician looking for the computing system 202a/300 in a datacenter may feel and listen for the vibration morse code "dash" in order to locate that computing device 202a/300. Furthermore, in embodiments in which computing systems may have their locations indicated by vibration morse code "dashes", the location of different computing systems may be indicated by different numbers of vibration morse code "dashes" (e.g., one vibration morse code "dash" for a first computing system whose location is required, two vibration morse code "dashes" for a second computing system whose location is required, and so on). However, while a specific example of the use of particular vibrations to indicate the location of computing systems has been illustrated and described, one of skill in the art in possession of the present disclosure will appreciate how vibrations (e.g., relatively more intense vibrations vs relatively less intense vibrations, combinations of vibration morse code "dots" and "dashes", etc.) may be utilized in a variety of manners to indicate the location of computing systems while remaining within the scope of the present disclosure as well.

With reference to FIG. 9B, in an embodiment of block 506, the location indication engine 310a in the management device 310 of the computing system 202a/300 may perform vibration-based location indication operations 902 that include driving the vibration device 312 to produce a vibration 902a based on the location indication instruction received at block 504. In a specific example in which the location indication instruction is a computing component location indication instruction (e.g., from the management system 206 or generated by the management device 310) that instructs the indication of a location of the computing component 304 in the computing system 300, the vibration-based location indication operations 902 may be performed by the location indication engine 310a to drive the vibration device 312 to produce the vibration 902a that, in the illustrated example, includes a plurality of short vibration periods that are configured to indicate the location of the computing component 304 in the computing system 300.

To provide a specific example, the vibration-based location indication operations 902 may be configured to indicate the location of the computing component 304 in the computing system 300 using vibration-based morse code that provides one or more vibration morse code "dots" for the computing component 304, an example of which is illustrated by the vibration 902a in FIG. 9A. As such, a datacenter technician looking for the computing component 304 in a datacenter may feel and listen for the vibration morse code "dot(s)" in order to locate the computing system 300 that includes that computing component 304. Furthermore, in embodiments in which computing components may have their locations indicated by vibration morse code "dots", the location of different computing components may be indicated by different numbers of vibration morse code "dots" (e.g., one vibration morse code "dot" for a first computing component whose location is required, two vibration morse code "dots" for a second computing component whose location is required, and so on). However, while a specific example of the use of particular vibrations to indicate the location of computing components has been illustrated and described, one of skill in the art in possession of the present disclosure will appreciate how vibrations (e.g., relatively more intense vibrations vs relatively less intense vibrations, combinations of vibration morse code "dots" and "dashes", etc.) may be utilized in a variety of manners to indicate the location of computing components while remaining within the scope of the present disclosure as well.

Figure 10A:
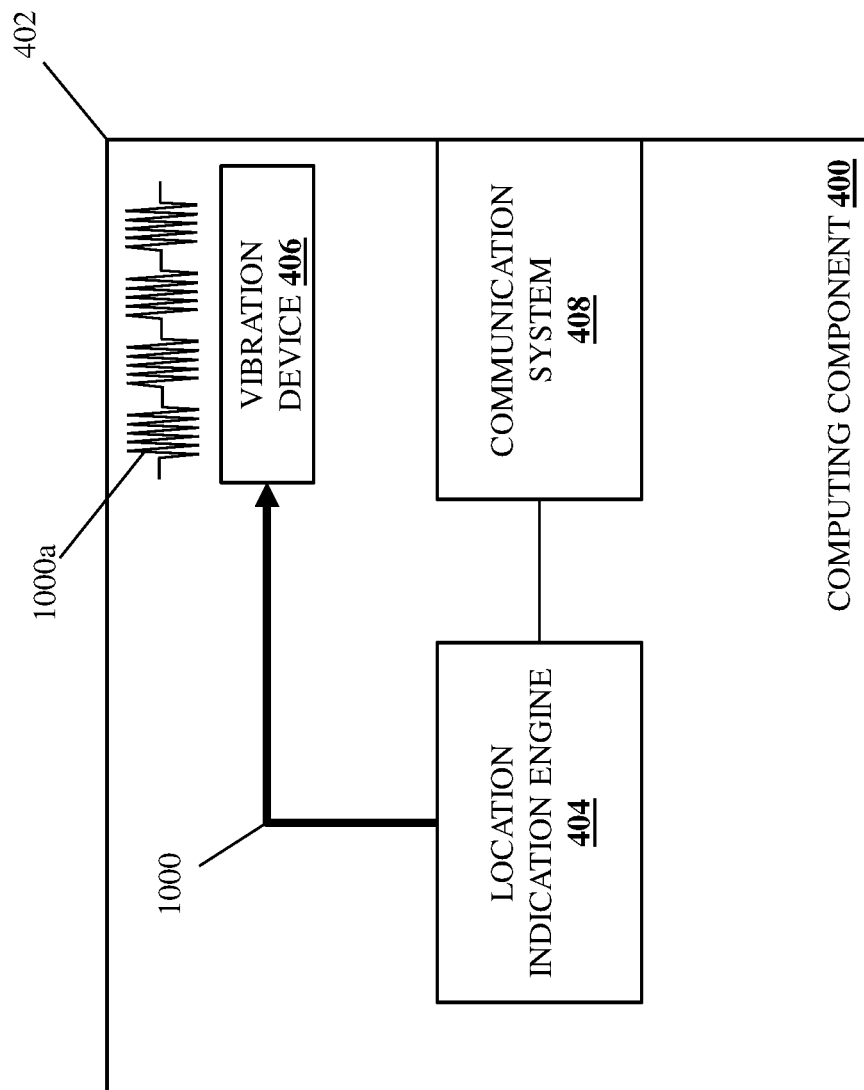
FIG. 10A is a schematic view illustrating an embodiment of the computing component of FIG. 4 operating during the method of FIG. 5.
Figure 10B:
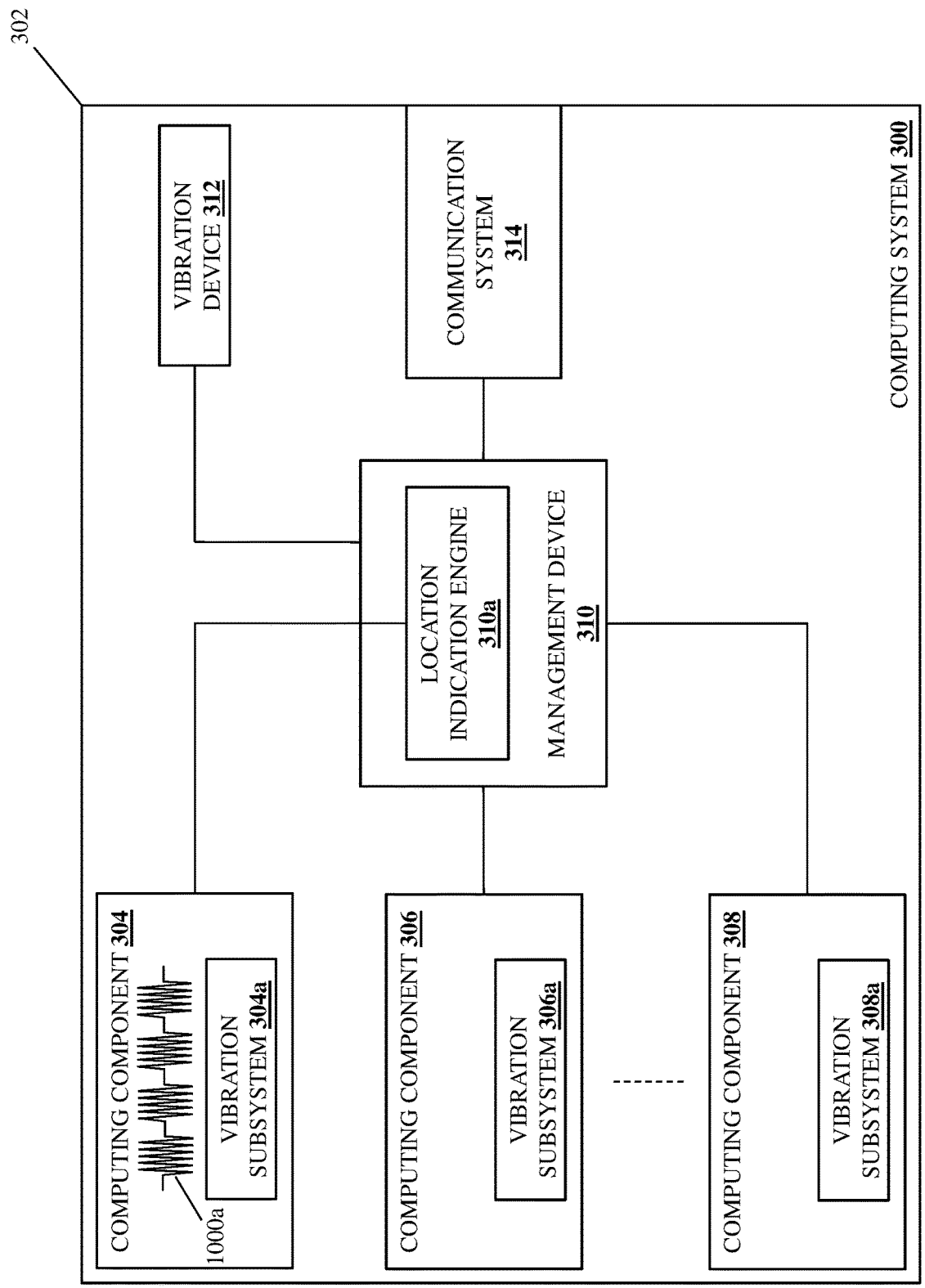
FIG. 10B is a schematic view illustrating an embodiment of the computing system of FIG. 3 operating during the method of FIG. 5.

With reference to FIGS. 10A and 10B, in an embodiment of block 506, the location indication engine 404 in the computing component 304/400 of the computing system 202a/300 may perform vibration-based location indication operations 1000 that include driving the vibration device 406 to produce a vibration 1000a based on the location indication instruction received at block 504. As discussed above, the location indication instruction may be a computing component location indication instruction (e.g., received from the management system 206 via the management device 310, generated by the management device 310, generated by the location indication engine 404) that instructs the indication of a location of the computing component 304/400, and the vibration-based location indication operations 1000 may be performed by the location indication engine 404 to drive the vibration device 406 to produce the vibration 1000a that, in the illustrated example, includes a plurality of short vibration periods that are configured to indicate the location of the computing component 304.

Figure 11:
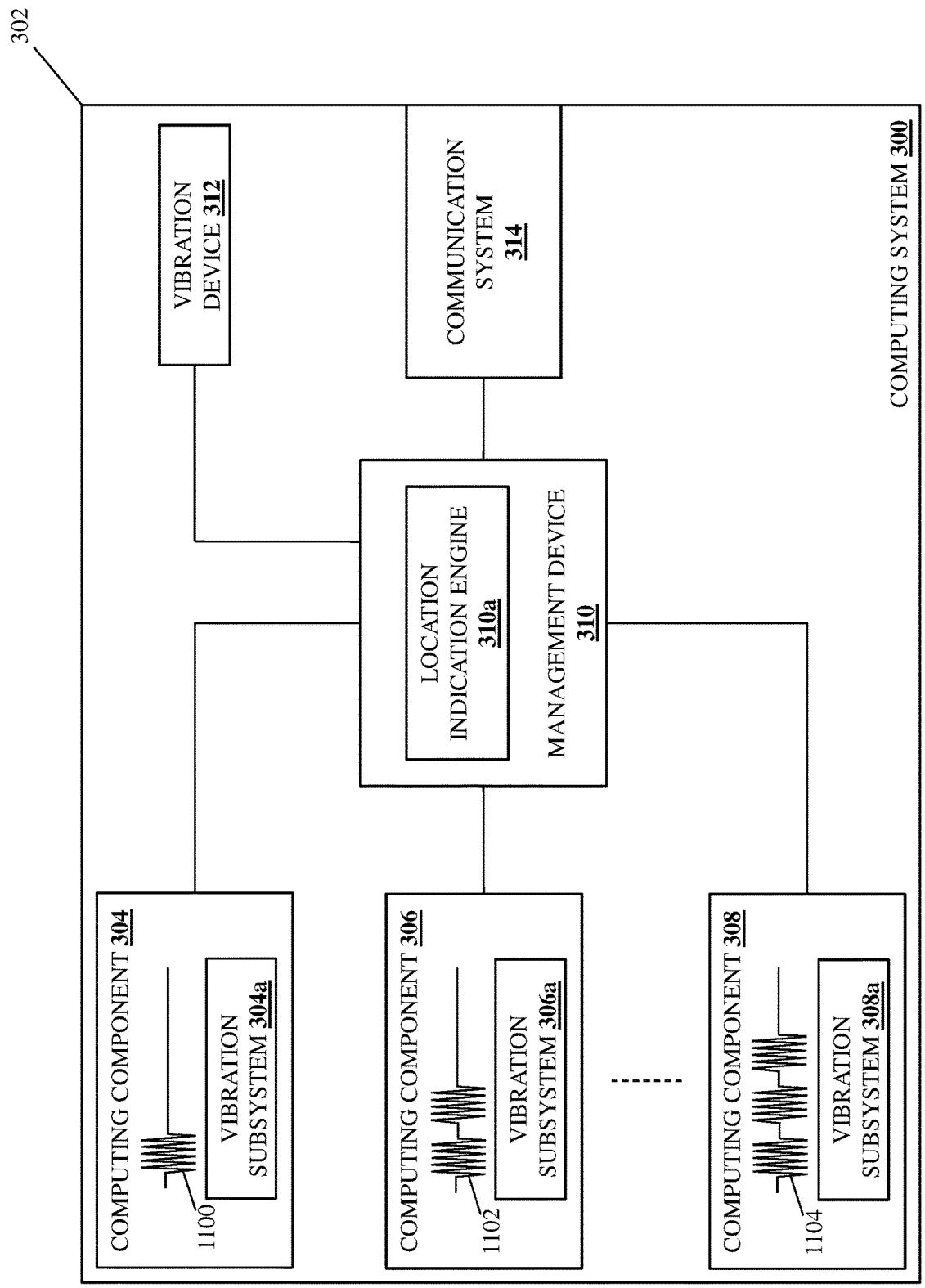
FIG. 11 is a schematic view illustrating an embodiment of the computing system of FIG. 3 operating during the method of FIG. 5.

Similarly as described above, the vibration-based location indication operations 1000 may be configured to indicate the location of the computing component 304/400 using vibration-based morse code that provides one or more vibration morse code "dots" for the computing component 304/400, an example of which is illustrated by the vibration 1000a in FIGS. 10A and 10B. As such, a datacenter technician looking for the computing component 304/400 in a datacenter may feel and listen for the vibration morse code "dot(s)" in order to locate that computing component 304/400. Furthermore, FIG. 11 illustrates an embodiment in which different computing components may have their locations indicated by different numbers of vibration morse code "dots" (e.g., one vibration morse code "dot" 1100 for computing component 304 whose location is required, two vibration morse code "dots" for the computing component 306 whose location is required, three vibration morse code "dots" for the computing component 308 whose location is required, and so on). However, while a specific example of the use of particular vibrations to indicate the location of computing components has been illustrated and described, one of skill in the art in possession of the present disclosure will appreciate how vibrations (e.g., relatively more intense vibrations vs relatively less intense vibrations, combinations of vibration morse code "dots" and "dashes", etc.) may be utilized in a variety of manners to indicate the location of computing components while remaining within the scope of the present disclosure as well.

As such, at block 506, a datacenter technician may utilize the vibrations (and/or sound produced via those vibrations) to locate the computing system(s) or computing component(s) they are attempting to service or replace. Furthermore, one of skill in the art in possession of the present disclosure will appreciate how the location indication instructions described herein may provide for the vibrations described above for a limited period of time or number of vibrations, and/or how the vibration-based location indication system may allow the datacenter technician to stop those vibrations once a computing system or computing component has been located (e.g., via a switch on the computing system or computing component, through the network 204 via the management system 206, etc.).

Thus, systems and methods have been described that provide for the indication of a location of a computing system or a computing component by vibrating a vibration device included in that computing system or that computing component. For example, the vibration-based location indication system of the present disclosure may include a computing system that is coupled to a management system via a network. The computing system includes a computing system vibration device, and a computing system location indication subsystem that is coupled to the network and the computing system vibration device. The computing system location indication subsystem receives a computing system location indication instruction to indicate a location of the computing system from the management system via the network and, based on the computing system location indication instruction, drives the computing system vibration device to produce a vibration that is configured to indicate the location of the computing system. As such, the issues with conventional visual location indications discussed above are remedied, allowing blind or visually impaired datacenter technicians to locate computing systems and computing components in datacenters, and assisting datacenter technicians with no visual impairments in locating computing systems and computing components in datacenters as well.

While the vibration-based location indication systems described above provide several benefits, particularly with regard to the locating of computing systems and computing components in a datacenter by blind or visually impaired datacenter technicians, the embodiments discussed above that provide a dedicated vibration device in the computing systems and/or computing components will be associated with higher costs related to the manufacturing and provisioning of those computing systems and/or computing components. However, as described below, the inventor of the present disclosure have developed a vibration-based location indication system based on the concepts described above that may be utilized with conventional computing systems and/or component components to enable the locating of computing systems and/or computing components via the use of vibrations.

Figure 12:
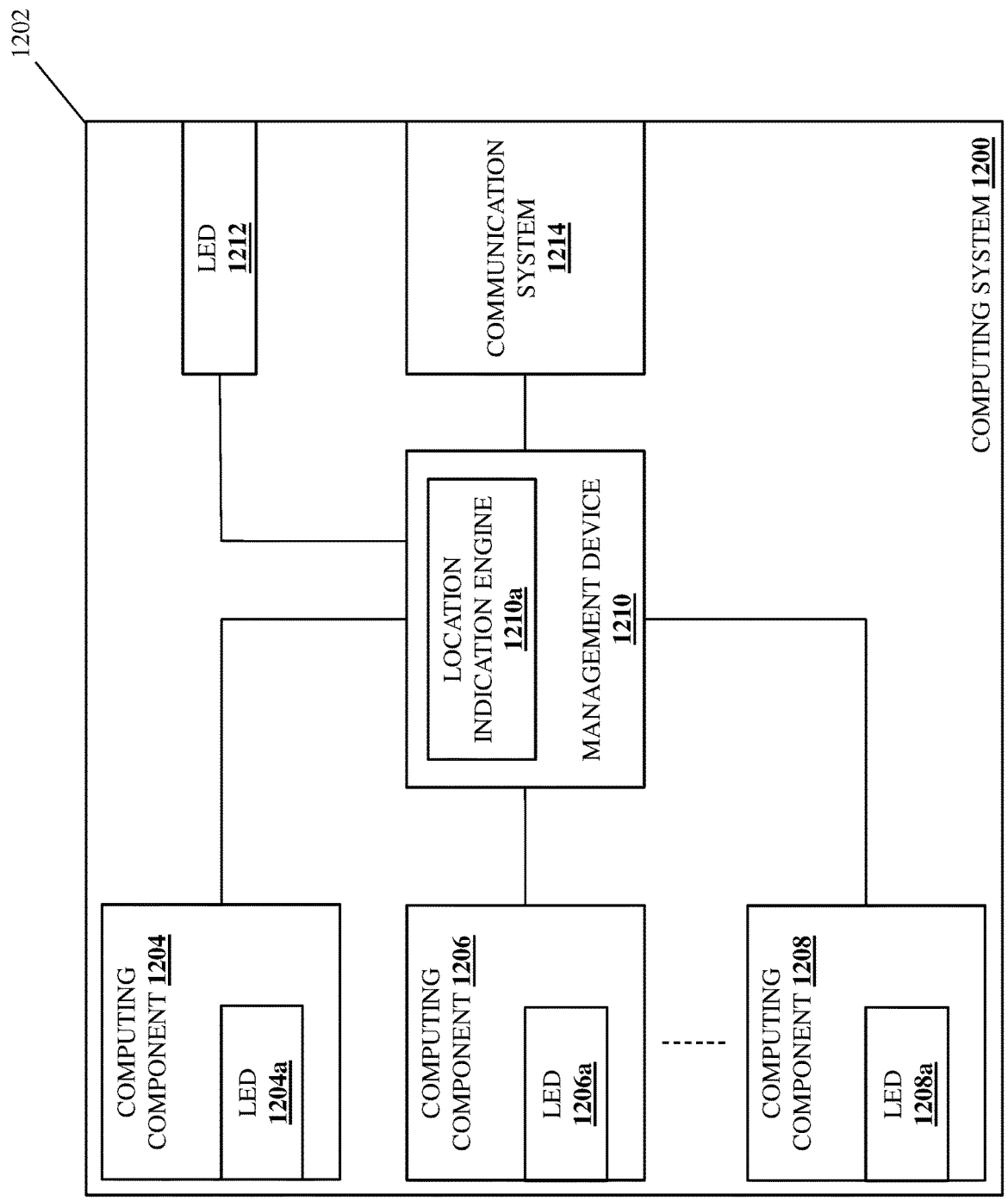
FIG. 12 is a schematic view illustrating an embodiment of a computing system that may be used with the vibration-based location indication system of the present disclosure.

Referring now to FIG. 12, an embodiment of a computing system 1200 is illustrated that may be used with the vibration-based location indication system of the present disclosure, and/or may provide any or all of the computing systems 202a-202c in the networked system 200 discussed above with reference to FIG. 2. As will be appreciated by one of skill in the art in possession of the present disclosure, the computing system 1200 may be provided by any of the conventional computing devices discussed above. As such, the computing system 1200 may be provided by the IHS 100 discussed above with reference to FIG. 1 and/or may include some or all of the components of the IHS 100, and in specific examples may be provided by server devices, switch devices, storage systems, and/or other datacenter computing systems that would be apparent to one of skill in the art in possession of the present disclosure. However, while illustrated and discussed as being provided by a datacenter computing system, one of skill in the art in possession of the present disclosure will recognize that the computing system 1200 may be provided by any computing systems that may be configured to operate similarly as the computing system 1200 discussed below.

In the illustrated embodiment, the computing system 1200 includes a chassis 1202 that houses the components of the computing system 1200, only some of which are illustrated and discussed below. For example, in the illustrated embodiment, the chassis 1202 houses a plurality of computing components 1204, 1206, and up to 1208. As will be appreciated by one of skill in the art in possession of the present disclosure, the computing components 1204-1208 may be provided by any of a variety of conventional computing components known in the art. In an embodiment, any or all of the computing components 1204-1208 may be provided by components of the IHS 100 discussed above with reference to FIG. 1, and in the specific examples below are described as being provided by storage devices, Power Supply Units (PSU) devices, fan systems, other Field Replaceable Unit (FRU) devices, and/or any other computing component that would be apparent to one of skill in the art in possession of the present disclosure. As illustrated in FIG. 12, each of the computing components 1204, 1206, and up to 1208 may include a respective Light Emitting Device (LED) 1204a, 1206a, and up to 1208a that one of skill in the art in possession of the present disclosure will recognize may be configured as a component locator LED for use emitting light to enable the locating of that computing component.

In the illustrated embodiment, the chassis 1202 also houses a management device 1210 that is coupled to each of the computing components 1204-1208. In an embodiment, the management device 1210 may be provided by the IHS 100 discussed above with reference to FIG. 1 and/or may include some or all of the components of the IHS 100, and in specific examples may be provided by a Baseboard Management Controller (BMC) device such as the integrated DELL® Remote Access Controller (iDRAC) device available in server devices provided by DELL®, Inc. of Round Rock, Texas, United States, as well as any other management devices that would be apparent to one of skill in the art in possession of the present disclosure. As such, the management device 1210 may provide an Out-Of-Band (OOB) management platform on the computing system 1200 that includes resources that are mostly separate from the resources of the computing system 1200, and that may provide a browser-based and/or Command Line Interface (CLI) for managing and monitoring of hardware and/or software in the computing system 1200, as well as performing any of the functionality described below. However, while illustrated and discussed as being provided by a particular management device, one of skill in the art in possession of the present disclosure will recognize that the management device 1210 may be provided by any management device that may be configured to operate similarly as the management device 1210 discussed below.

In the embodiments illustrated and described below, the management device 1210 may include a management processing system (not illustrated, but which may be similar to the processor 102 discussed above with reference to FIG. 1) and a management memory system (not illustrated, but which may be similar to the memory 114 discussed above with reference to FIG. 1) that is coupled to the management processing system and that includes instructions that, when executed by the management processing system, cause the management processing system to provide a location indication engine 1210a that is configured to perform the functionality of the location indication engines, location indication subsystems, and/or computing systems discussed below. As will be appreciated by one of skill in the art in possession of the present disclosure, the location indication engine 1210a may be coupled to each of the computing components 1204-1208 via, for example, a coupling between the management processing system and the computing components 1204-1208. The chassis 1202 may also house a Light Emitting Device (LED) 1212 that one of skill in the art in possession of the present disclosure will recognize may be configured as a system locator LED for use emitting light to enable the locating of the computing system 1200, and that is coupled to the location indication engine 1210a in the management device 1210 (e.g., via a coupling between the management processing system and the LED 1212).

The chassis 1202 may also house a communication system 1214 that is coupled to the location indication engine 1210a (e.g., via a coupling between the communication system 1208 and the management processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing system 1200 has been illustrated and described, one of skill in the art in possession of the present disclosure will recognize that computing systems may include a variety of components and/or component configurations for providing conventional computing system functionality while remaining within the scope of the present disclosure as well.

Figure 13:
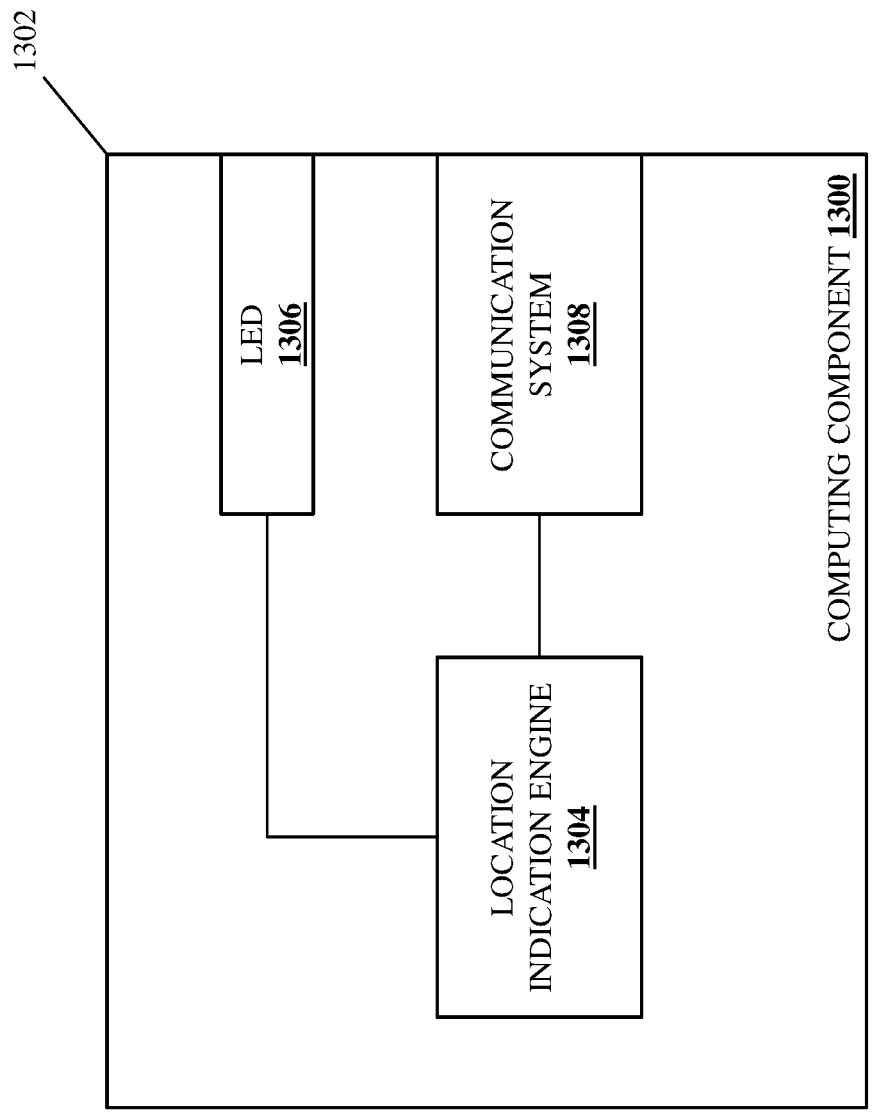
FIG. 13 is a schematic view illustrating an embodiment of a computing component that may be used with the vibration-based location indication system of the present disclosure.

Referring now to FIG. 13, an embodiment of a computing component 1300 is illustrated that may be used with the vibration-based location indication system of the present disclosure, and/or may provide any or all of the computing components 1204-1208 discussed above with reference to FIG. 12. As such, the computing component 1300 may provide a component in the IHS 100 discussed above with reference to FIG. 1, and in specific examples may be provided by storage devices, Power Supply Units (PSU) devices, fan systems, other Field Replaceable Unit (FRU) devices, and/or any other computing component that would be apparent to one of skill in the art in possession of the present disclosure. However, while illustrated and discussed as being provided by particular computing components, one of skill in the art in possession of the present disclosure will recognize that the computing component 1300 may be provided by any computing components that may be configured to operate similarly as the computing component 1300 discussed below.

In the illustrated embodiment, the computing component 100 includes a chassis 102 that houses the components of the computing component 1300, only some of which are illustrated and discussed below. For example, in the illustrated embodiment, the chassis 1302 may house a component processing system (not illustrated, but which may be similar to the processor 102 discussed above with reference to FIG. 1 and may be provided by a component controller, component microcontroller, and/or other component processor that would be apparent to one of skill in the art in possession of the present disclosure) and a component memory system (not illustrated, but which may be similar to the memory 114 discussed above with reference to FIG. 1 and may be provided by a component controller, component microcontroller, and/or other component memory that would be apparent to one of skill in the art in possession of the present disclosure) that is coupled to the component processing system and that includes instructions that, when executed by the component processing system, cause the component processing system to provide a location indication engine 1304 that is configured to perform the functionality of the location indication engines, location indication subsystems, and/or computing components discussed below. The chassis 1302 may also house a Light Emitting Device (LED) 1306 that one of skill in the art in possession of the present disclosure will recognize may be configured as a component locator LED for use emitting light to enable the locating of the computing component 1300, and that is coupled to the location indication engine 1304 (e.g., via a coupling between the management processing system and the LED 1306).

The chassis 1302 may also house a communication system 1308 that is coupled to the location indication engine 1304 (e.g., via a coupling between the communication system 1308 and the component processing system) and that may be provided by any computing component communication devices that would be apparent to one of skill in the art in possession of the present disclosure. However, while a specific computing component 1300 has been illustrated and described, one of skill in the art in possession of the present disclosure will recognize that computing components may include a variety of component subsystems and/or component subsystem configurations for providing conventional computing component functionality while remaining within the scope of the present disclosure as well.

Figure 14B:
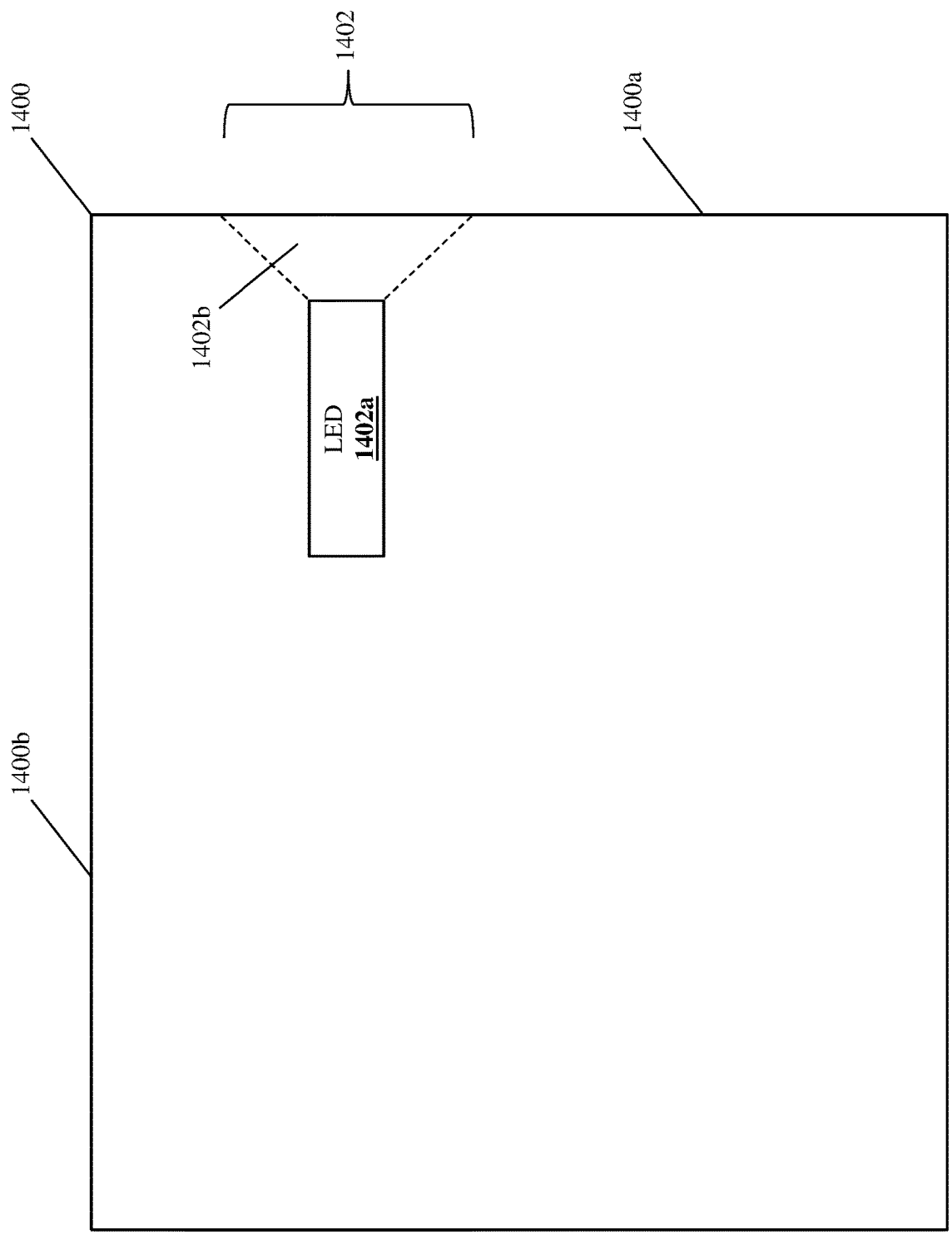
FIG. 14B is a cross-sectional view along the line 14B in FIG. 14A illustrating an embodiment of the LED subsystem on the computing system of FIG. 12.

Referring now to FIGS. 14A and 14B, an embodiment of a chassis 1400 is illustrated that may provide the chassis 1202 of the computing system 1200, and/or the chassis 1302 of the computing component 1300. The chassis 1400 may include a front surface 1400a, a top surface 1400b that extends substantially perpendicularly from the front surface 1400a, and a side surface 1400c that extends substantially perpendicularly from the front surface 1400a and the top surface 1400b. In the illustrated embodiment, the chassis 1400 includes an LED subsystem 1402 that includes an LED 1402a that is housed in the chassis 1400 and that may provide any of the LEDs 1204a, 1206a, and/or 1208a on the computing components 1204, 1206, and/or 1208 discussed above with reference to FIG. 12, the LED 1212 on the computing system 1200 discussed above with reference to FIG. 12, and/or the LED 1306 on the computing component 1300 discussed above with reference to FIG. 13. Furthermore, the LED system 1402 also includes a light detection subsystem housing 1402b that is defined by the chassis 1400 and extends into the front surface 1400a of the chassis 1400 to the LED 1402a. In a specific example, the LED subsystem 1402 may provide a magnet adjacent the light detection subsystem housing 1402b in order to, for example, magnetically interact with the light detection subsystems described below.

In the illustrated embodiment, the light detection subsystem housing 1402b includes a conical frustum shape, although one of skill in the art in possession of the present disclosure will appreciate how a variety of other shapes of the light detection subsystem housing 1402b will fall within the scope of the present disclosure as well. However, while a chassis has been illustrated and described that includes light detection subsystem housing, one of skill in the art in possession of the present disclosure will appreciate how embodiment of the present disclosure may omit the light detection subsystem housing and provide the LED 1402a flush with a surface (e.g., the front surface 1400a) of the chassis 1400 while remaining within the scope of the present disclosure as well.

Figure 15:
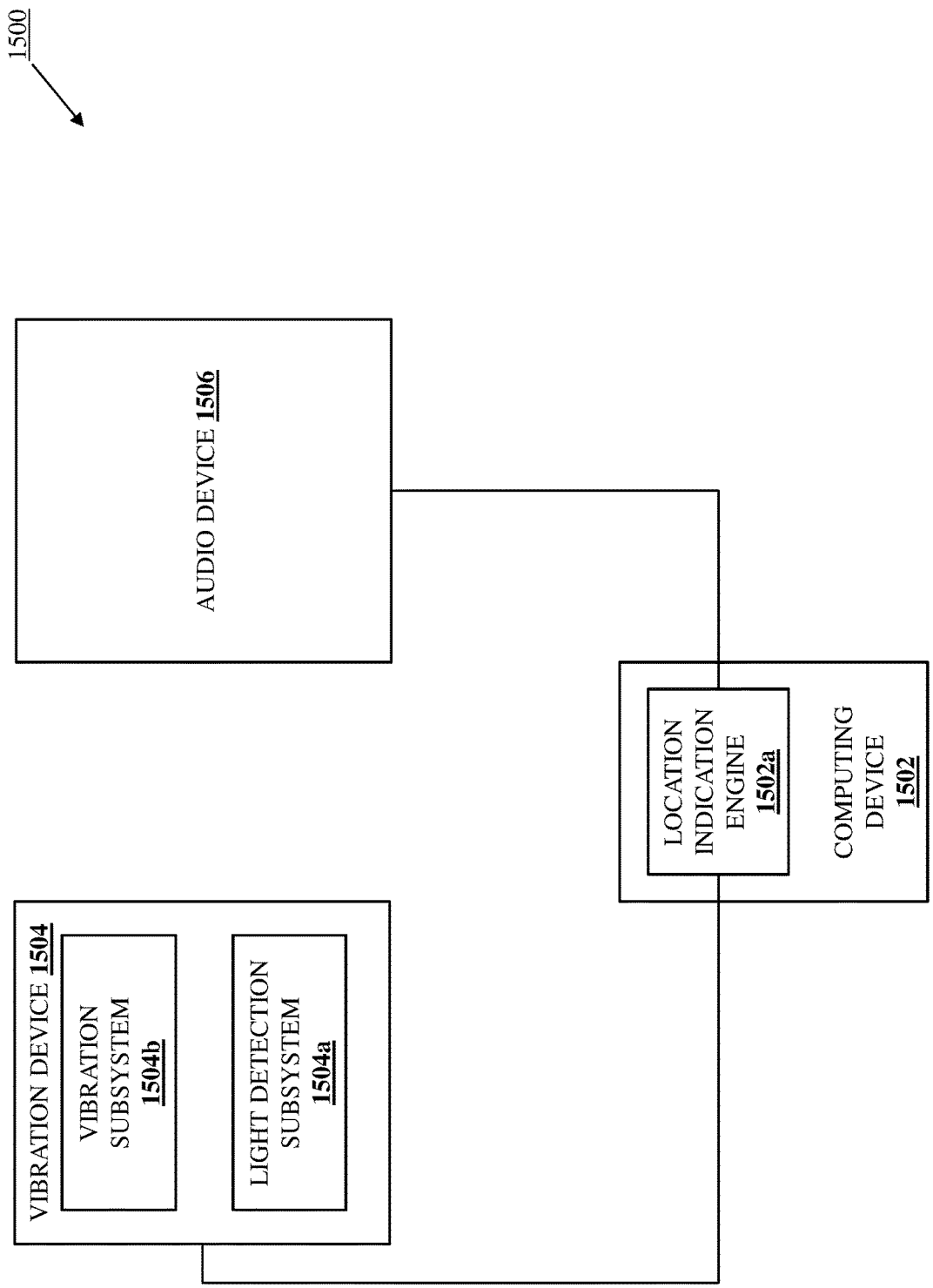
FIG. 15 is a schematic view illustrating an embodiment of a vibration-based location indication system provided according to the teachings of the present disclosure.

With reference to FIG. 15, an embodiment of a vibration-based location indication system 1500 is illustrated that may be provided according to the teachings of the present disclosure. As will be appreciated by one of skill in the art in possession of the present disclosure, while the vibration-based location indication system 1500 is illustrated in FIG. 15 as including separate components (e.g., with each component provided in a separate chassis), one of skill in the art in possession of the present disclosure will appreciate how the components of the vibration-based location indication system 1500 may be integrated into a single device (e.g., a single chassis) while remaining within the scope of the present disclosure as well.

The vibration-based location indication system 1500 includes a computing device 1502 that may include a processing system (not illustrated, but which may be similar to the processor 102 discussed above with reference to FIG. 1) and a memory system (not illustrated, but which may be similar to the memory 114 discussed above with reference to FIG. 1) that is coupled to the processing system and that includes instructions that, when executed by the processing system, cause the processing system to provide a location indication engine 1502a that is configured to perform the functionality of the location indication engines, location indication subsystems, and/or computing devices discussed below. In some examples, the computing device 1502 may be provided by a portable computing device such as a laptop/notebook computing device, a tablet computing device, a mobile phone, and/or other mobile computing devices known in the art. However, as discussed above, in other examples, the location indication engine 1502a and/or computing device 1502 may be integrated with the other components of the vibration-based location indication system 1500 (e.g., in the same chassis) while remaining within the scope of the present disclosure as well.

The vibration-based location indication system 1500 also include a vibration device 1504 that is coupled to the location indication engine 1502a, and that coupling may be provided by a wired connection (e.g., a cabled connection) or a wireless connection (e.g., a BLUETOOTH® wireless connection, a Near Field Communication (NFC) wireless connection, etc.). In the illustrated embodiment, the vibration device 1504 includes a light detection subsystem 1504a that may include a photodetector or other light detection device that one of skill in the art in possession of the present disclosure would recognize as providing the light detection functionality described below, and a vibration subsystem 1504b that may be provided by any of a variety of vibration motors that one of skill in the art in possession of the present disclosure would recognize as providing the vibration-based location indication functionality described below.

The vibration-based location indication system 1500 also include an audio device 1506 that is coupled to the location indication engine 1502a, and that coupling may be provided by a wired connection (e.g., a cabled connection) or a wireless connection (e.g., a BLUETOOTH® wireless connection, a Near Field Communication (NFC) wireless connection, etc.). In the illustrated embodiment, the audio device 1506 may be provided by headphones, a speaker, and/or other audio devices that would be apparent to one of skill in the art in possession of the present disclosure. As such, one of skill in the art in possession of the present disclosure will appreciate how one specific example of the vibration-based location indication system may include a mobile phone computing device 1502 that wirelessly connects to a headphone audio device 1506 and the vibration device 1504. However, while a specific vibration-based location indication system has been illustrated and described, one of skill in the art in possession of the present disclosure will appreciate how the vibration-based location indication system of the present disclosure may include a variety of components and/or component configurations for providing the functionality described below while remaining within the scope of present disclosure as well.

Figure 16A:
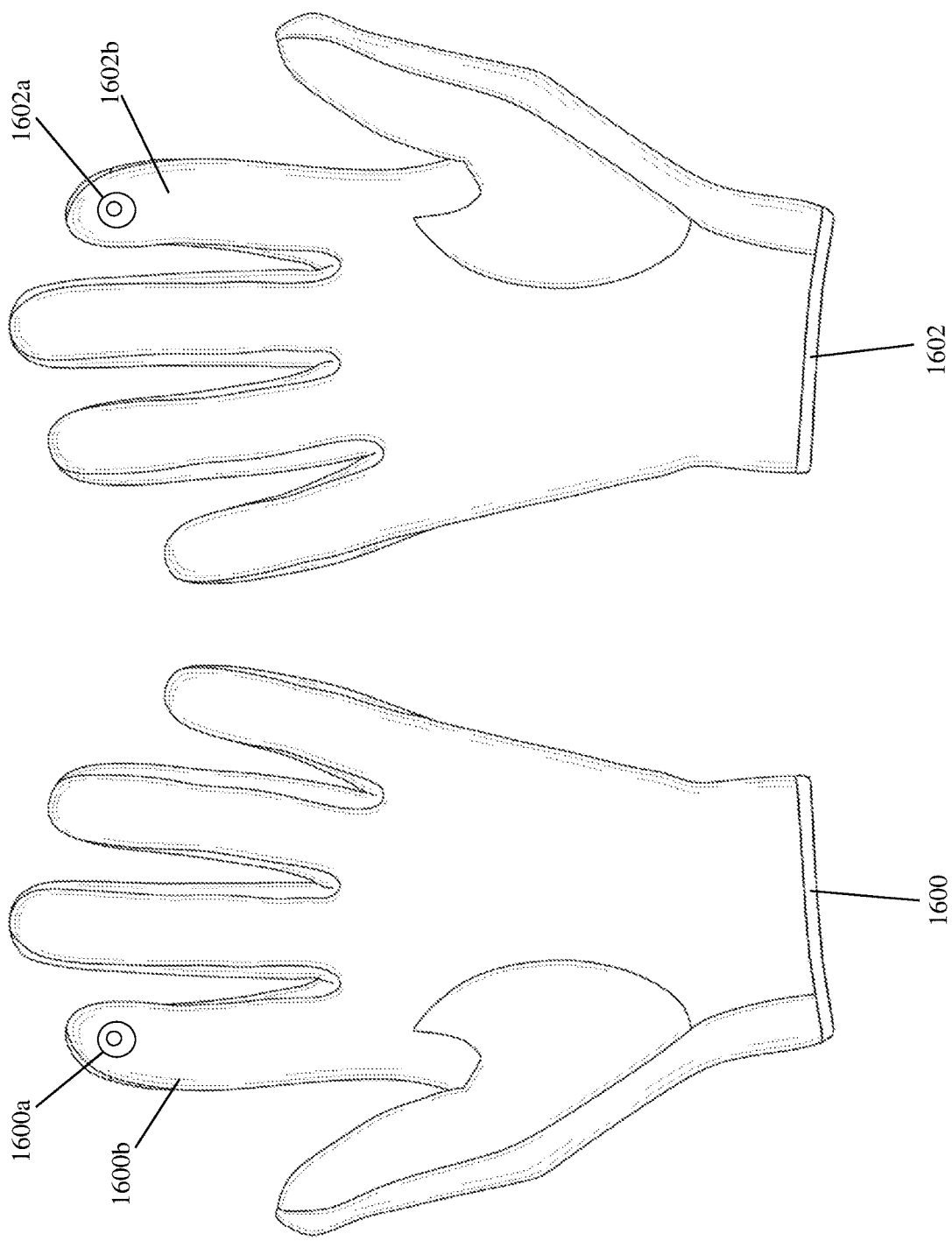
FIG. 16A is a perspective view illustrating an embodiment of the vibration-based location indication system of FIG. 15.
Figure 16B:
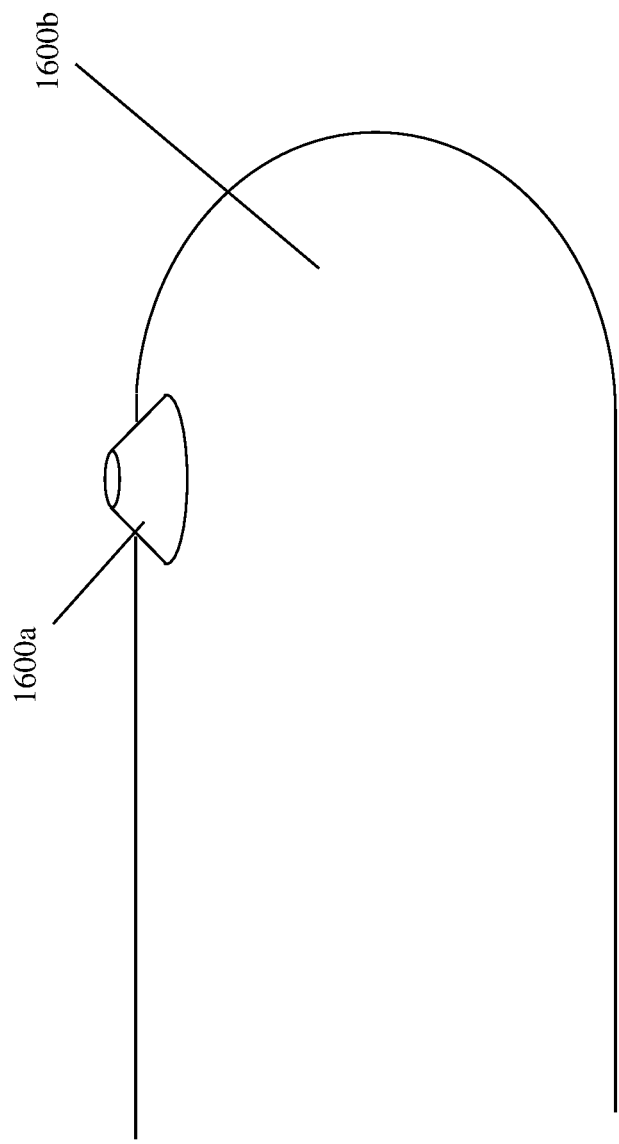
FIG. 16B is a perspective view illustrating an embodiment of a light detection subsystem on the vibration-based location indication system of FIG. 16A.

With reference to FIGS. 16A and 16B, an embodiment of a vibration-based location indication system 1600 is illustrated that may provide at least a portion of the vibration-based location indication system 1500 discussed above with reference to FIG. 15. For example, in some embodiments the vibration-based location indication system 1600 may include all the components of the vibration-based location indication system 1500 discussed above with reference to FIG. 15, while in other embodiments the vibration-based location indication system 1600 may provide the vibration device 1504 of the vibration-based location indication system 1500 discussed above with reference to FIG. 15. As can be seen in FIG. 16A, the vibration-based location indication system 1600 may be provided by a pair of gloves 1600 and 1602 that may provide the chassis of the vibration-based location indication system 1500 that houses each of the computing device 1502, vibration device 1504, and audio device 1506 discussed above with reference to FIG. 15, or that may provide the chassis of the vibration device 1504 discussed above with reference to FIG. 15 that houses the light detection subsystem 1504a and the vibration subsystem 1504b and is wirelessly coupled to the computing device 1502 (e.g., a mobile phone). Furthermore, while a pair of gloves 1600 and 1602 are illustrated and described, one of skill in the art in possession of the present disclosure will appreciate how the benefits of the present disclosure may be realized via the use of one of the gloves 1600 or 1602 while remaining within the scope of the present disclosure as well.

As illustrated, a light detection subsystem 1600a is provided on a finger 1600b of the glove 1600 (e.g., an "index" finger), and a light detection subsystem 1602a is provided on a finger 1602b of the glove 1602 (e.g., an "index" finger), and either or both of the light detection subsystems 1600a and 1602a may be provide the light detection subsystem 1504a in the vibration device 1504 of the vibration-based location indication system 1500 discussed above with reference to FIG. 15. In a specific example, the light detection subsystem 1600a may include a magnet in order to, for example, magnetically interact with the light detection subsystem housing 1402b on the chassis 1400 described above and in further detail below. FIG. 16B illustrates how the light detection subsystem 1600a provided on the finger 1600b of the glove 1600 may include a conical frustum shape that corresponds to the conical frustum shape of the light detection subsystem housing 1402b discussed above with reference to FIG. 14, and one of skill in the art in possession of the present disclosure will appreciate how the light detection subsystem 1602a provided on the finger 1602b of the glove 1602 may include a conical frustum shape as well. However, while a specific shape and location of the light detection subsystems 1600a and 1602a has been described, one of skill in the art in possession of the present disclosure will appreciate how the light detection subsystem of the present disclosure may be provided in a variety of shapes and locations that will fall within the scope of the present disclosure as well.

Figure 17:
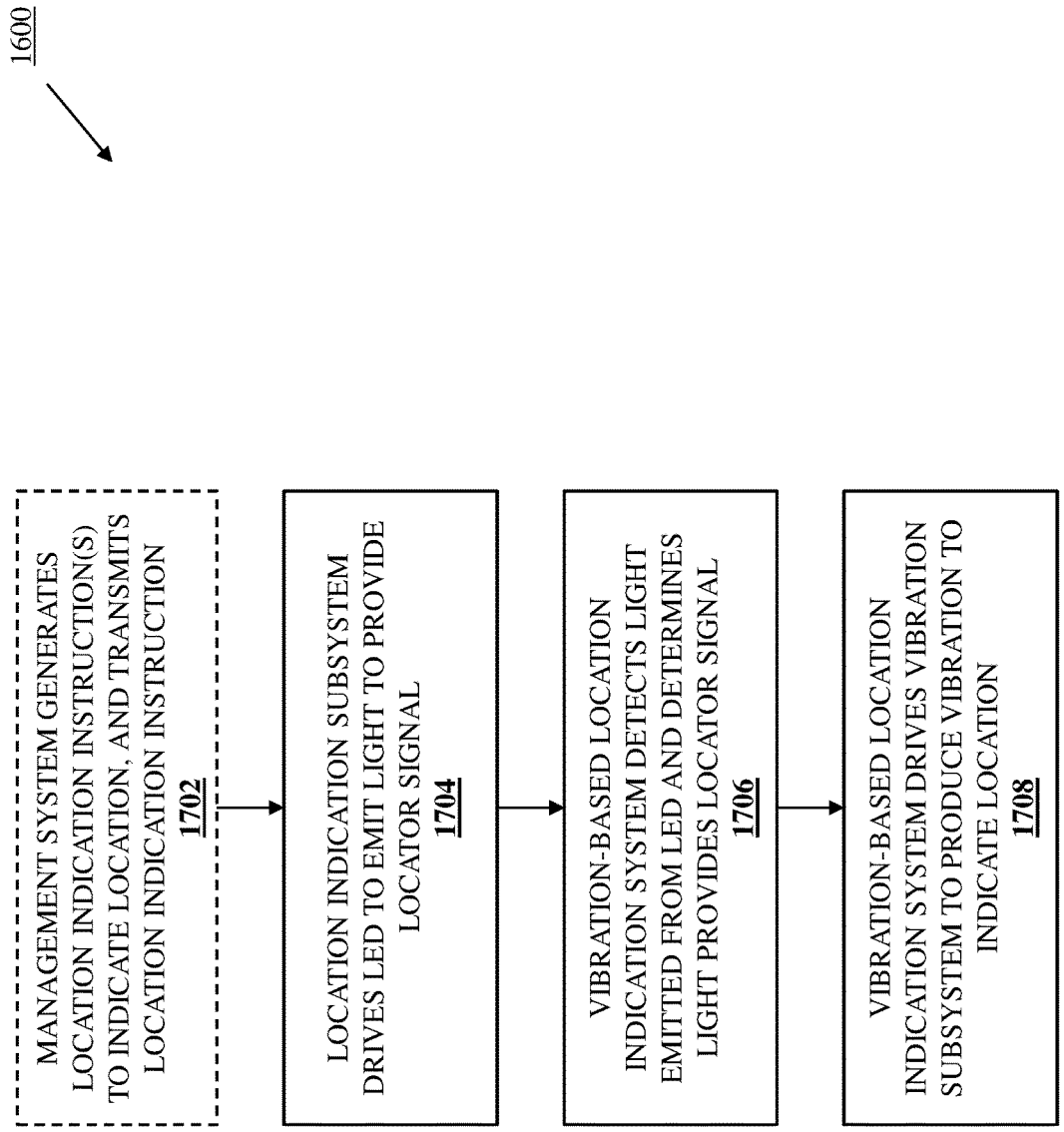
FIG. 17 is a flow chart illustrating an embodiment of a method for indicating a location of a computing system or computing component using vibrations.

Referring now to FIG. 17, an embodiment of a method 1700 for indicating a location of a computing system or computing device using vibrations is illustrated. As discussed below, the systems and methods of the present disclosure detect a locator signal provided via light emitted by computing system or computing component and, in response, generate a vibration to identify the detection of that locator signal. For example, the computing system locating system of the present disclosure may include a computing system having a computing system light emitting device that is configured to emit light to provide a computing system locating signal, and a vibration-based location indication system. The vibration-based location indication system includes a light detection subsystem that is configured to detect the computing system locating signal via the light emitted from the computing system light emitting device on the computing system, and a vibration subsystem that is configured to vibrate. A location indication subsystem in the vibration-based location indication system that is coupled to the light detection subsystem and the vibration subsystem determines that the light detection subsystem has detected the computing system locating signal via the light emitted from the computing system light emitting device on the computing system and, in response, drives the vibration subsystem to produce a vibration to indicate the location of the computing system. As such, the issues with conventional visual location indications discussed above are remedied without a need to increase the costs of the computing systems or computing components being located, allowing blind or visually impaired datacenter technicians to locate computing systems and computing components in datacenters.

The method 1700 may begin at optional block 1702 where a management system generates at least one location indication instruction to indicate a location, and transmits the location indication instruction. In the specific embodiment of block 1702 illustrated in FIG. 18A and in many of the examples provided below, the management system 206 may perform location indication instruction provisioning operations 1800 that may include generating at least one location indication instruction, and transmitting the location indication instruction(s) to via the network 204 to the computing system 202a. However, while the location indication instruction is illustrated and described in many of the examples below as being provided to the computing system 202a, one of skill in the art in possession of the present disclosure will appreciate how location indication instructions may be provided to any of the computing systems 202b-202c in a similar manner while remaining within the scope of the present disclosure as well.

To provide a specific example, the management system 206 may be configured to operate (e.g., with the management device 1210 in any of the computing systems 202a-202c/1200) to provide a management user interface that is provided for display to a network administrator or other user of the management system 206, and that allows the network administrator or other user to generate and transmit the location indication instruction(s) to the computing systems 202a-202c/1200 and/or their computing component(s) 1204-1208 to indicate their respective location. For example, the management user interface may allow the network administrator or other user to select any of the computing systems 202a-202c/1200 and/or their computing components 1204-1208, and then apply a "visual" indication instruction to the selected computing systems/computing components that one of skill in the art in possession of the present disclosure will appreciate may cause LEDs in those computing systems and/or computing components to illuminate in order to indicate their location.

Figure 18B:
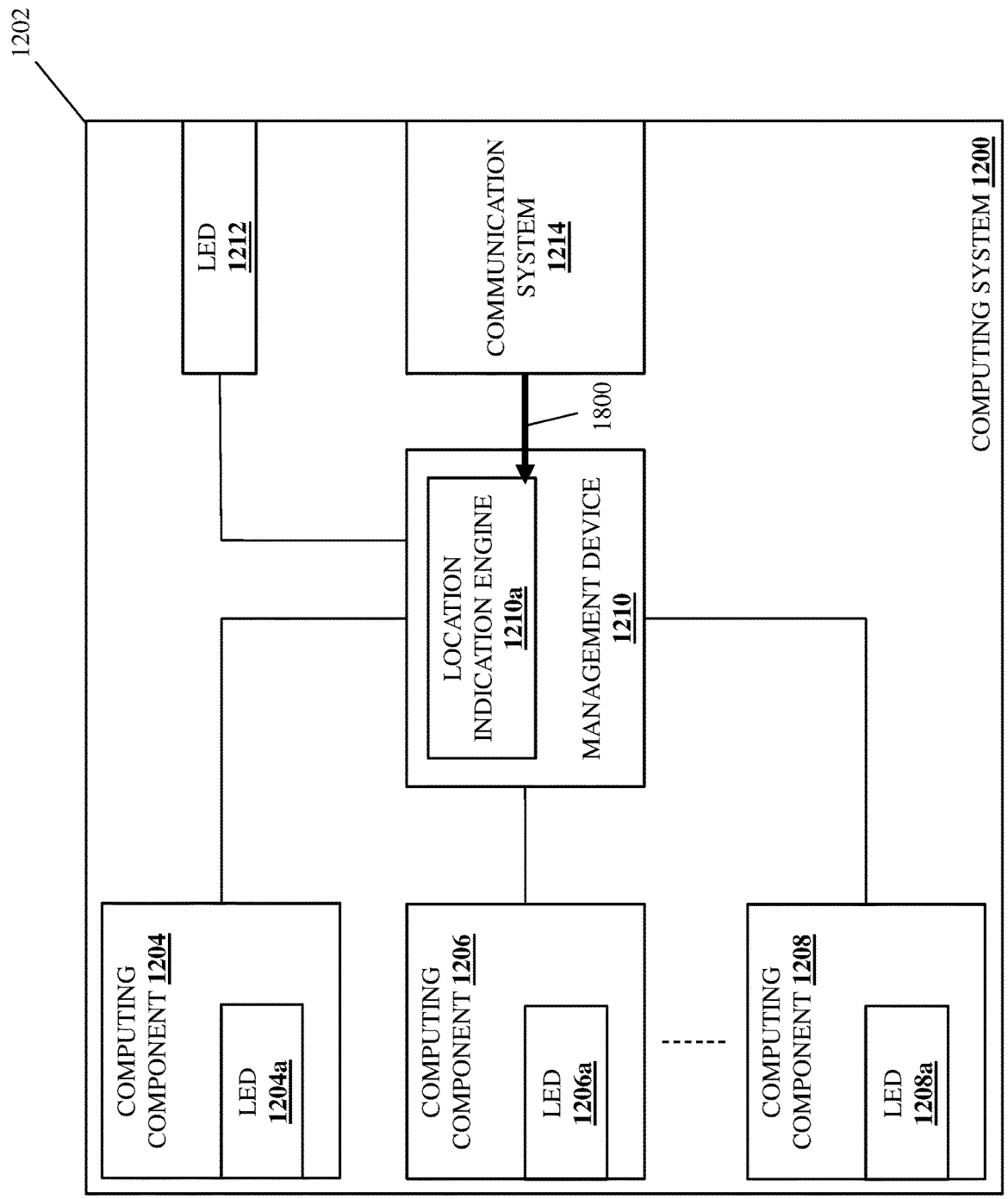
FIG. 18B is a schematic view illustrating an embodiment of the computing system of FIG. 12 operating during the method of FIG. 17.
Figure 18C:
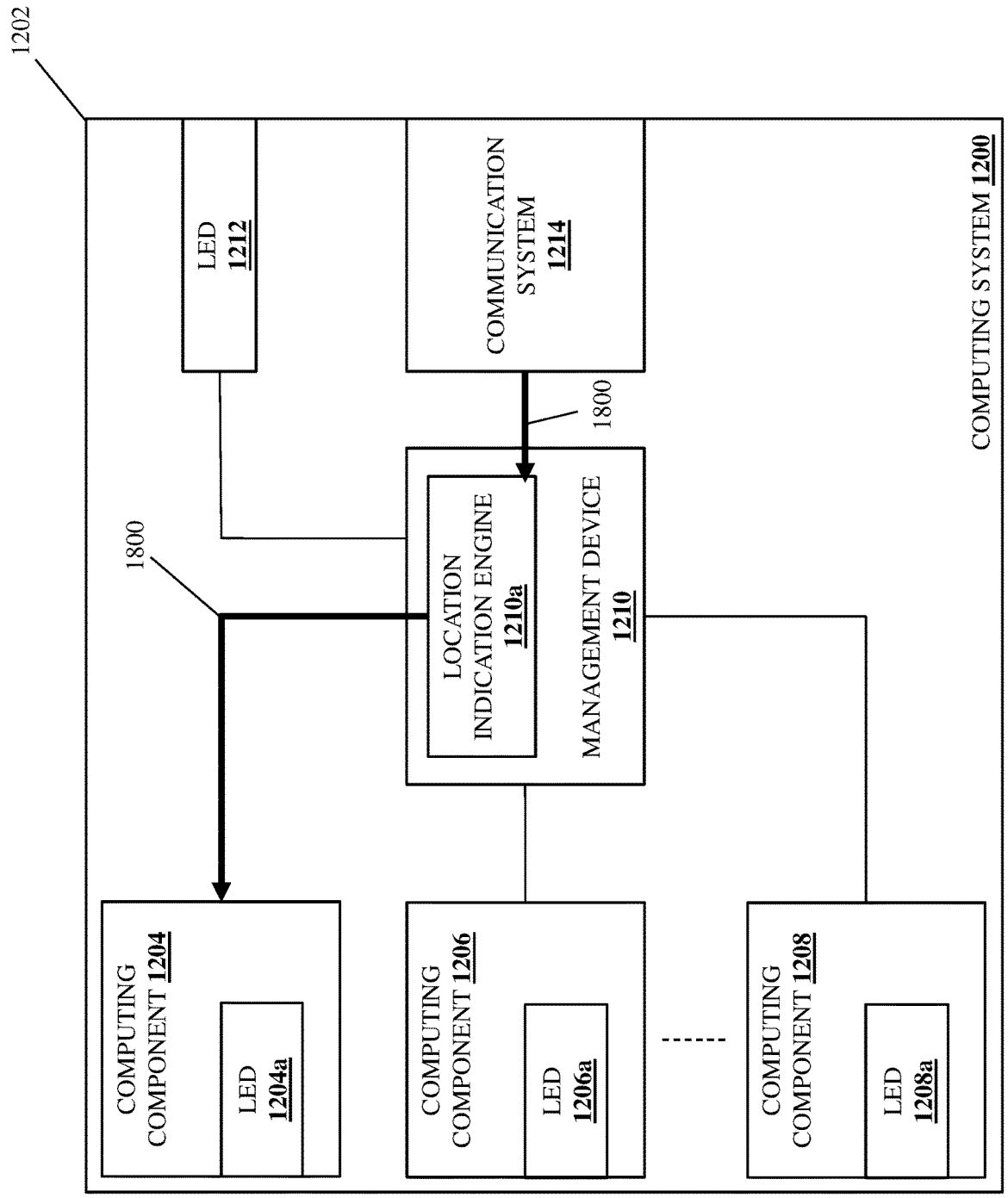
FIG. 18C is a schematic view illustrating an embodiment of the computing system of FIG. 12 operating during the method of FIG. 17.
Figure 18D:
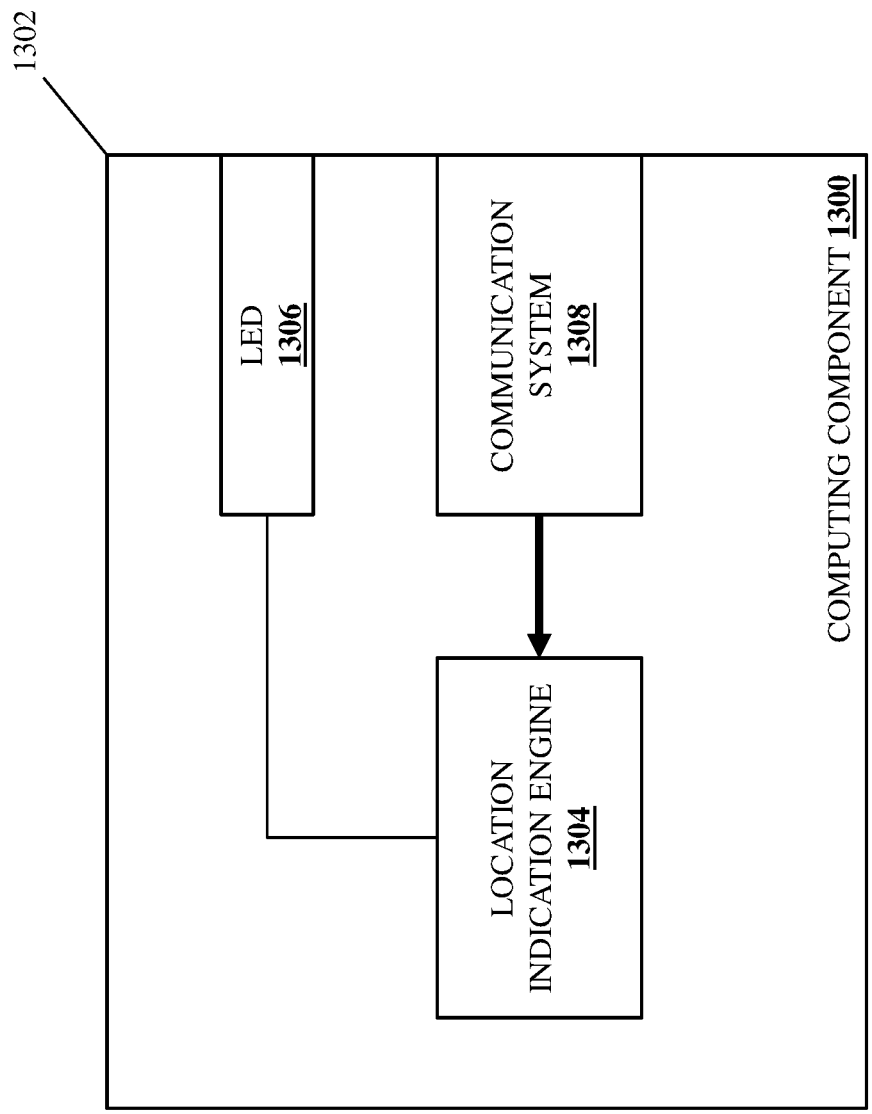
FIG. 18D is a schematic view illustrating an embodiment of the computing component of FIG. 13 operating during the method of FIG. 17.

As such, as illustrated in FIG. 18B, the location indication engine 1210a in the management device 1210 included in the computing system 1200 may receive computing system location indication instructions and/or computing component location indication instructions transmitted as part of the location indication instruction provisioning operations 1800 via its communication system 1214. Similarly, as illustrated in FIGS. 18C and 18D, the location indication engine 1210a in the management device 1210 included in the computing system 1200 may receive computing component location indication instructions transmitted as part of the location indication instruction provisioning operations 1800 via its communication system 1214, and may forward the computing component location indication instructions as part of the location indication instruction provisioning operations 1800 such that the location indication engine 1304 in the computing component 1204/1300 receives the computing component location indication instructions via its communication system 1308.

However, while a specific example of the generation of location indication instructions via a management system has been described, one of skill in the art in possession of the present disclosure will appreciate how the location indication instructions provided according to the teachings of the present disclosure may be generated in a variety of manners and using a variety of techniques that will fall within the scope of the present disclosure as well. For example, and as discussed below, in some embodiments optional block 1702 may be skipped and the location indication instructions provided according to the teachings of the present disclosure may be generated by the computing systems and/or computing components of the present disclosure while remaining within the scope of the present disclosure as well.

Figure 19A:
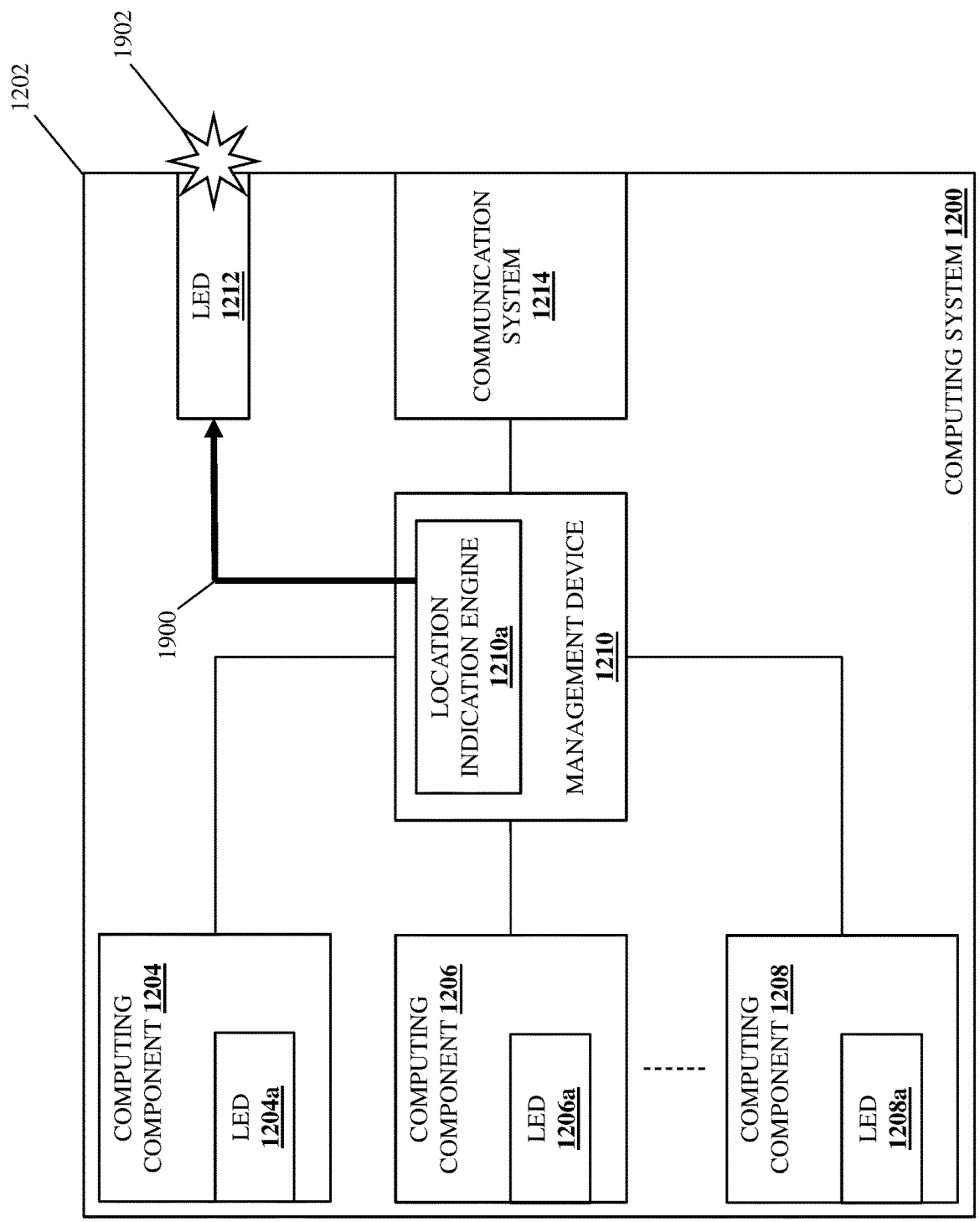
FIG. 19A is a schematic view illustrating an embodiment of the computing system of FIG. 12 operating during the method of FIG. 17.

The method 1700 may then proceed to block 1704 where a location indication subsystem drives an LED to emit light to provide a locator signal. With reference to FIG. 19A, in an embodiment of block 1704 and in response to receiving the computing system location indication instructions and/or computing component location indication instructions, the location indication engine 1210a in the management device 1210 of the computing system 202a/1200 may perform LED driving operations 1900 that include driving the LED 1212 to emit light 1902 to provide a locator signal. In some embodiments, the locator signal provided by the light 1902 may be configured to indicate the location of the computing system 1200, while in other embodiments the locator signal provided by the light 1902 may be configured to indicate the location of one of the computing components 1204-1208 in the computing system 1200, and one of skill in the art in possession of the present disclosure will appreciate how different techniques for emitting light (e.g., "blink" frequencies, a number of "blinks", etc.) may be utilized to provide the locator signal in a manner that allows for the distinguishing of the computing system 1200 and the computing components 1204-1208, as well as convey a variety of types of information about the computing system 1200 and/or the computing components 1204-1208.

Figure 19B:
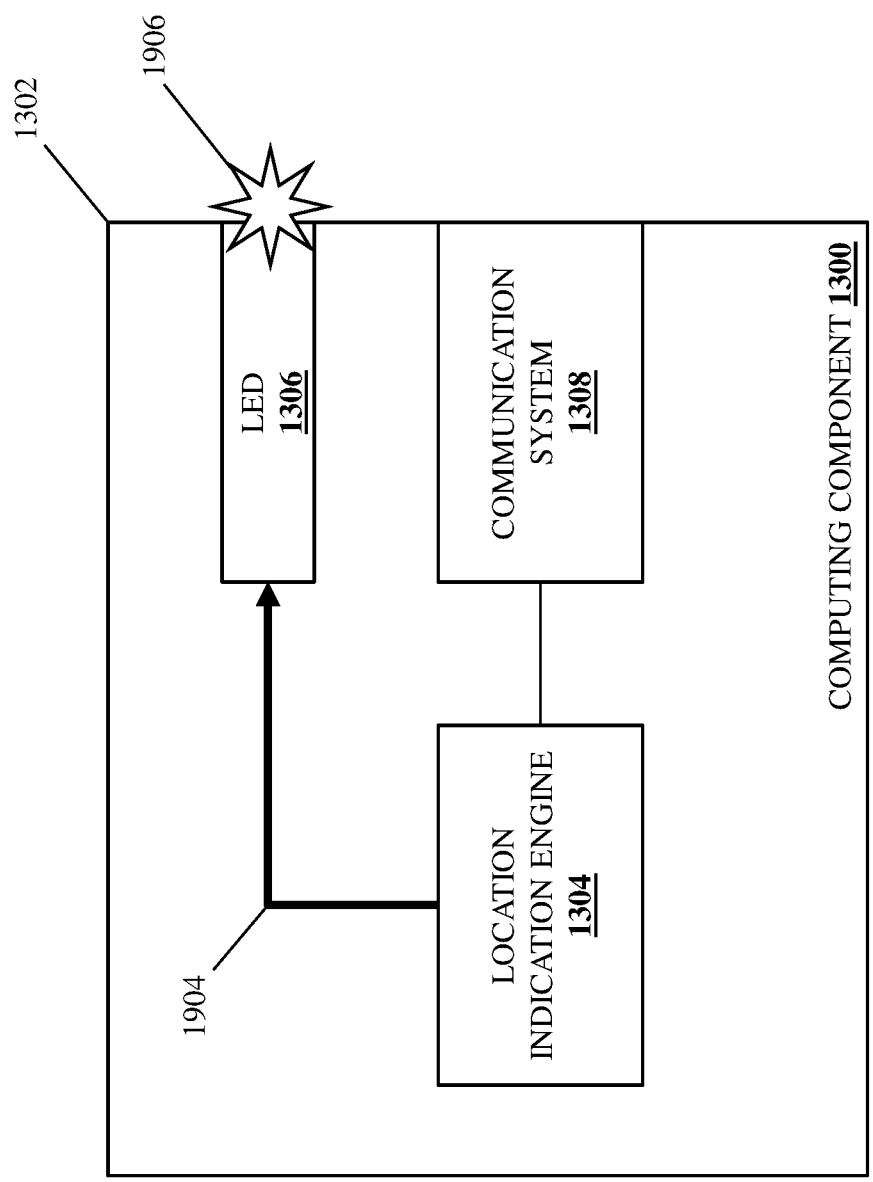
FIG. 19B is a schematic view illustrating an embodiment of the computing component of FIG. 13 operating during the method of FIG. 17.

Similarly, with reference to FIG. 19B, in an embodiment of block 1704 and in response to receiving the computing component location indication instructions, the location indication engine 1304 in the computing component 1300 may perform LED driving operations 1904 that include driving the LED 1306 to emit light 1906 to provide a locator signal. In some embodiments, the locator signal provided by the light 1906 may be configured to indicate the location of the computing component 1300, and one of skill in the art in possession of the present disclosure will appreciate how different techniques for emitting light (e.g., "blink" frequencies, a number of "blinks", etc.) may be utilized to provide the locator signal in a manner that allows for the distinguishing of the computing component 1300, as well as convey a variety of types of information about the computing components 1300. However, while a few specific examples of locator signals provided via the emission of light using LEDs have been described, one of skill in the art in possession of the present disclosure will appreciate how light may be emitted in a variety of manners to provide the locator signals described herein while remaining within the scope of the present disclosure as well.

Figure 20A:
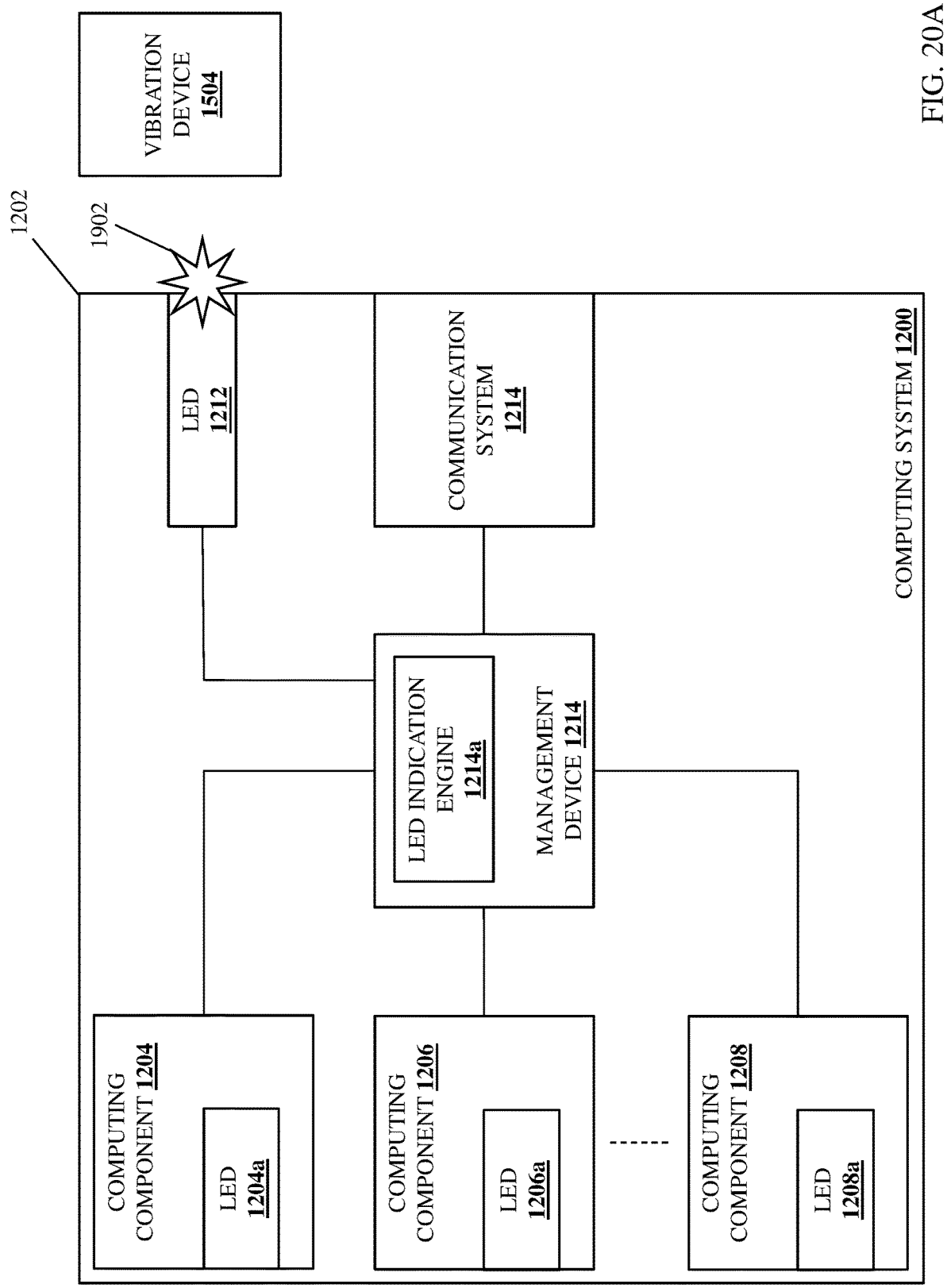
FIG. 20A is a schematic view illustrating an embodiment of a vibration device of the vibration-based location indication system of FIG. 15 being positioned adjacent the computing system of FIG. 19A during the method of FIG. 17.
Figure 20B:
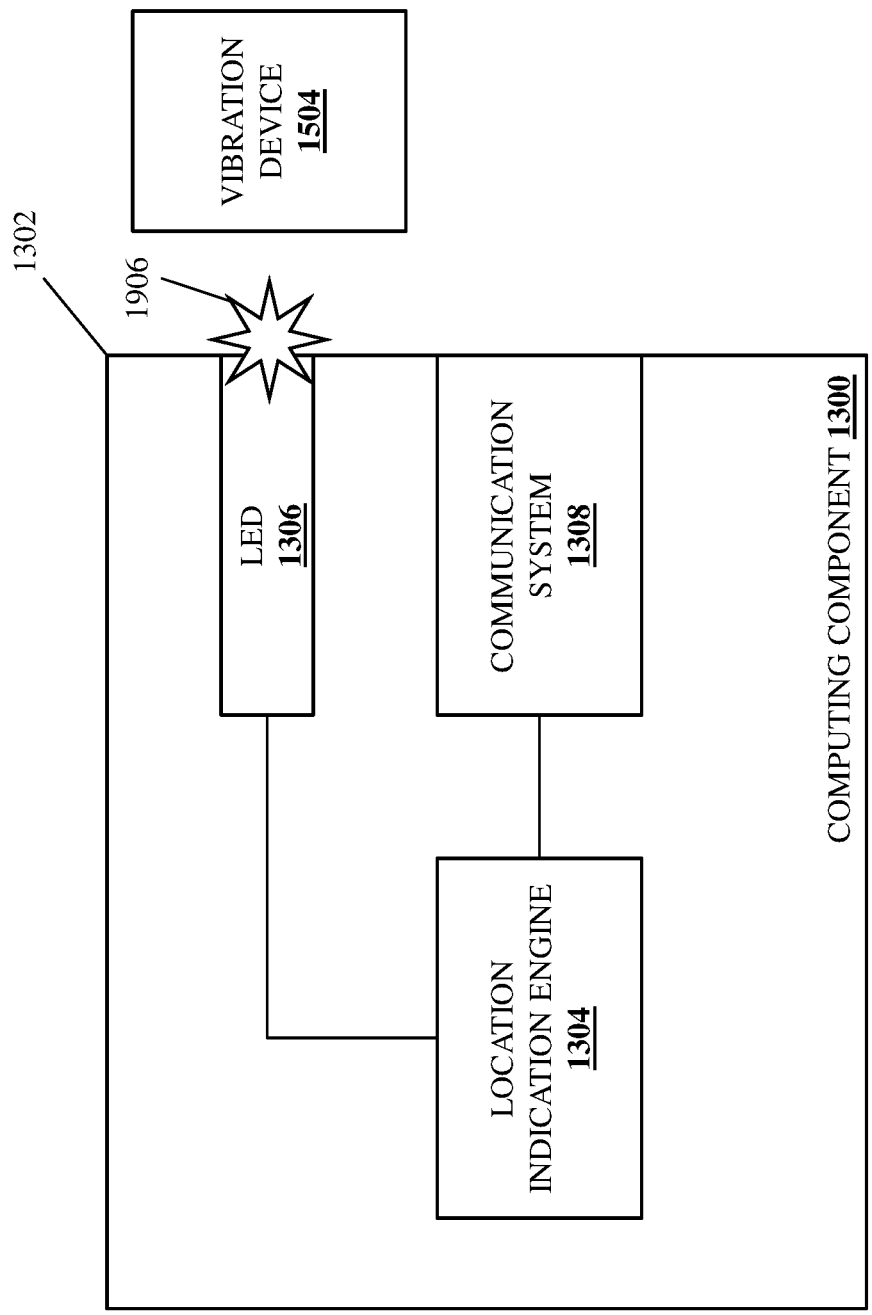
FIG. 20B is a schematic view illustrating an embodiment of a vibration device of the vibration-based location indication system of FIG. 15 being positioned adjacent the computing component of FIG. 19B during the method of FIG. 17.

The method 1700 then proceeds to block 1706 where a vibration-based location indication system detects the light emitted from the LED and determines that the light provides the locator signal. With reference to FIG. 20A, in an embodiment of block 1706, the vibration device 1504 of the vibration-based location indication system 1500 discussed above with reference to FIG. 15 may be positioned adjacent the computing system 1200 such that the light detection subsystem 1504a can detect the light 1902 being emitted from the LED 1212. Similarly, with reference to FIG. 20B, in an embodiment of block 1706, the vibration device 1504 of the vibration-based location indication system 1500 discussed above with reference to FIG. 15 may be positioned adjacent the computing component 1300 such that the light detection subsystem 1504*a* can detect the light 1906 being emitted from the LED 1306.

Figure 21A:
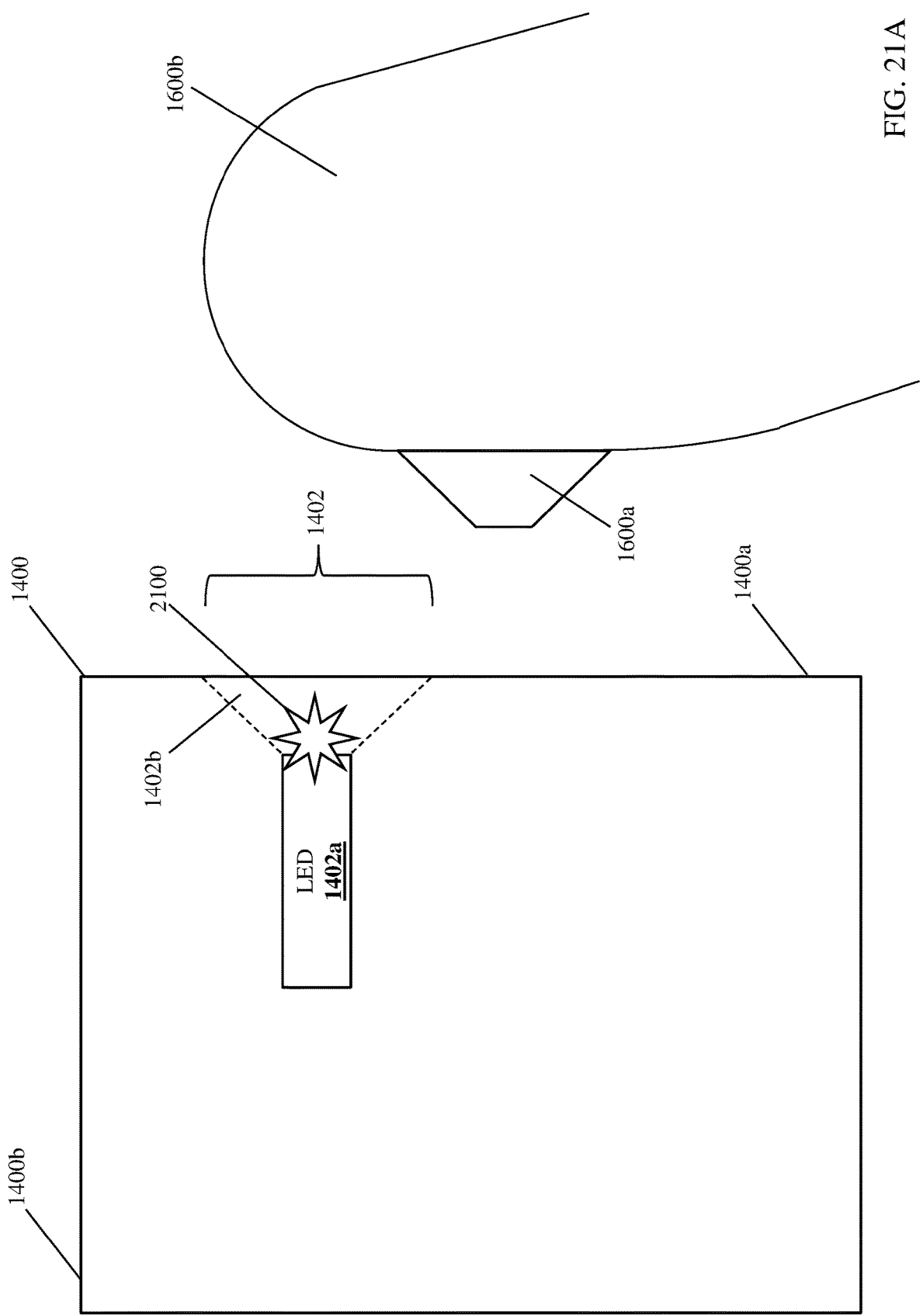
FIG. 21A is a schematic view illustrating an embodiment of the light detection subsystem on the vibration-based location indication system of FIGS. 16A and 16B being positioned adjacent the LED subsystem of FIG. 14B during the method of FIG. 17.
Figure 21B:
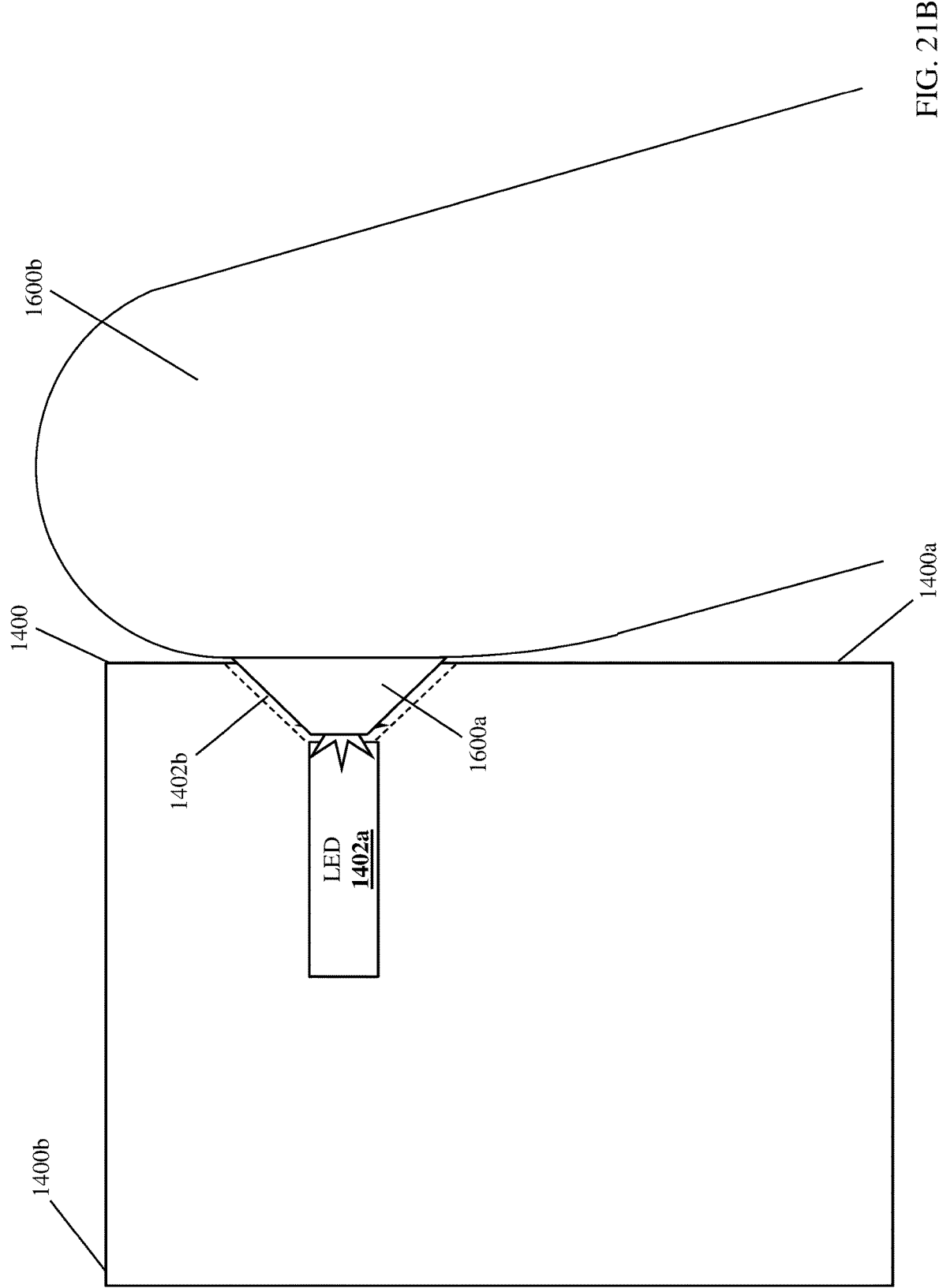
FIG. 21B is a schematic view illustrating an embodiment of the light detection subsystem on the vibration-based location indication system of FIGS. 16A and 16B positioned adjacent the LED subsystem of FIG. 14B during the method of FIG. 17.

With reference to FIGS. 21A and 21B, a specific example of block 1706 is illustrated in which a user wearing the glove 1600 discussed above with reference to FIGS. 16A and 16B moves the finger 1600*b* on the glove 1600 adjacent the front surface 1400*a* of the chassis 1400 until the light detection subsystem 1600*a* on that finger 1600*b* is positioned in the light detection subsystem housing 1402*b* that is defined by the chassis 1400 in order to detect light 2100 being emitted from the LED 1402*a*. As will be appreciated by one of skill in the art in possession of the present disclosure, embodiments that provide the light detection subsystem 1600*a* on the finger 1600*b* of the glove 1600 and the light detection subsystem housing 1402*b* defined by the chassis 1400 adjacent the LED 1402*a* allow a user (e.g., a blind or visually impaired user) to run the finger 1600*b* of the glove 1600 along the front surface 1400*a* of the chassis 1400 until the light detection subsystem 1600*a* enters the light detection subsystem housing 1402*b* in order to, for example, provide tactile feedback that light emission by the locator LED is being checked. Furthermore, in some specific examples, the light detection subsystem 1600*a* and the light detection subsystem housing 1402*b* may include magnets that are configured to interact to draw the light detection subsystem 1600*a* to and hold the light detection subsystem 1600*a* in the light detection subsystem housing 1402*b* to assist in aligning the light detection subsystem 1600*a* with the LED 1402*a*, providing the tactile feedback described above, and/or providing other benefits that would be apparent to one of skill in the art in possession of the present disclosure. However, while several specific examples of the detection of light have been described, one of skill in the art in possession of the present disclosure will appreciate how light may be detected in a variety of manners that will fall within the scope of the present disclosure as well.

Figure 22:
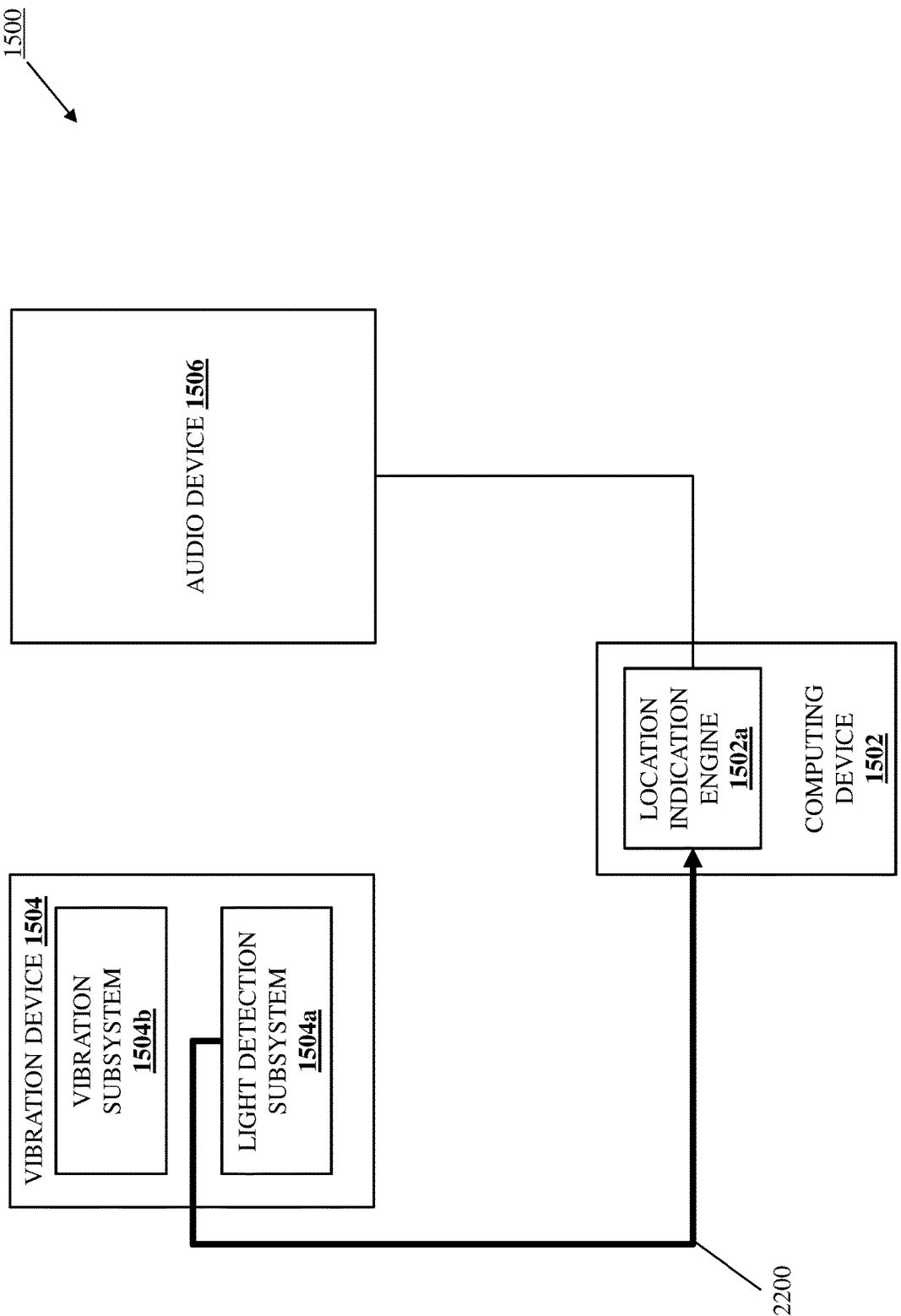
FIG. 22 is a schematic view illustrating an embodiment of the vibration-based location indication system of FIG. 15 operating during the method of FIG. 17.

With reference to FIG. 22, in response to detecting light emitted by an LED on the computing system or computing component described above, the light detection subsystem 1504*a* may perform light detection identification operations 2200 that include transmitting that identifying the detected light to the location indication engine 1502*a* in the computing device 1502 for use by the location indication engine 1502*a* to determine whether that light provides al locator signal. In an embodiment, the detection of light emitted by a computing system or computing component at block 1706 may result in the determination that the light provides a locator signal. For example, any of the LED's discussed above may be dedicated to providing locator signals, and thus the detection of light emitted from those LEDs may provide the detection of a locator signal. However, in other embodiments, the light emitted by any of the LED's discussed above may be analyzed by the location indication engine 1502*a* to determine whether that light provides a locator signal. For example, as described above, the LED 1212 on the computing system 1200 may be configured to provide a locator signal for the computing system 1200 or one of its computing components 1204-1208, and thus the different light emissions may provide different locator signals from that LED 1212. As such, one of skill in the art in possession of the present disclosure will appreciate how the location indication engine 1502*a* in the vibration-based location indication system 1500 may be configured to analyze the light emitted from any of the LEDs discussed above to determine whether that light provides a locator signal, a computing system or computing component for which a locator signal is being provided, and/or any other information that may be conveyed by the light emitted by that LED.

Figure 23:
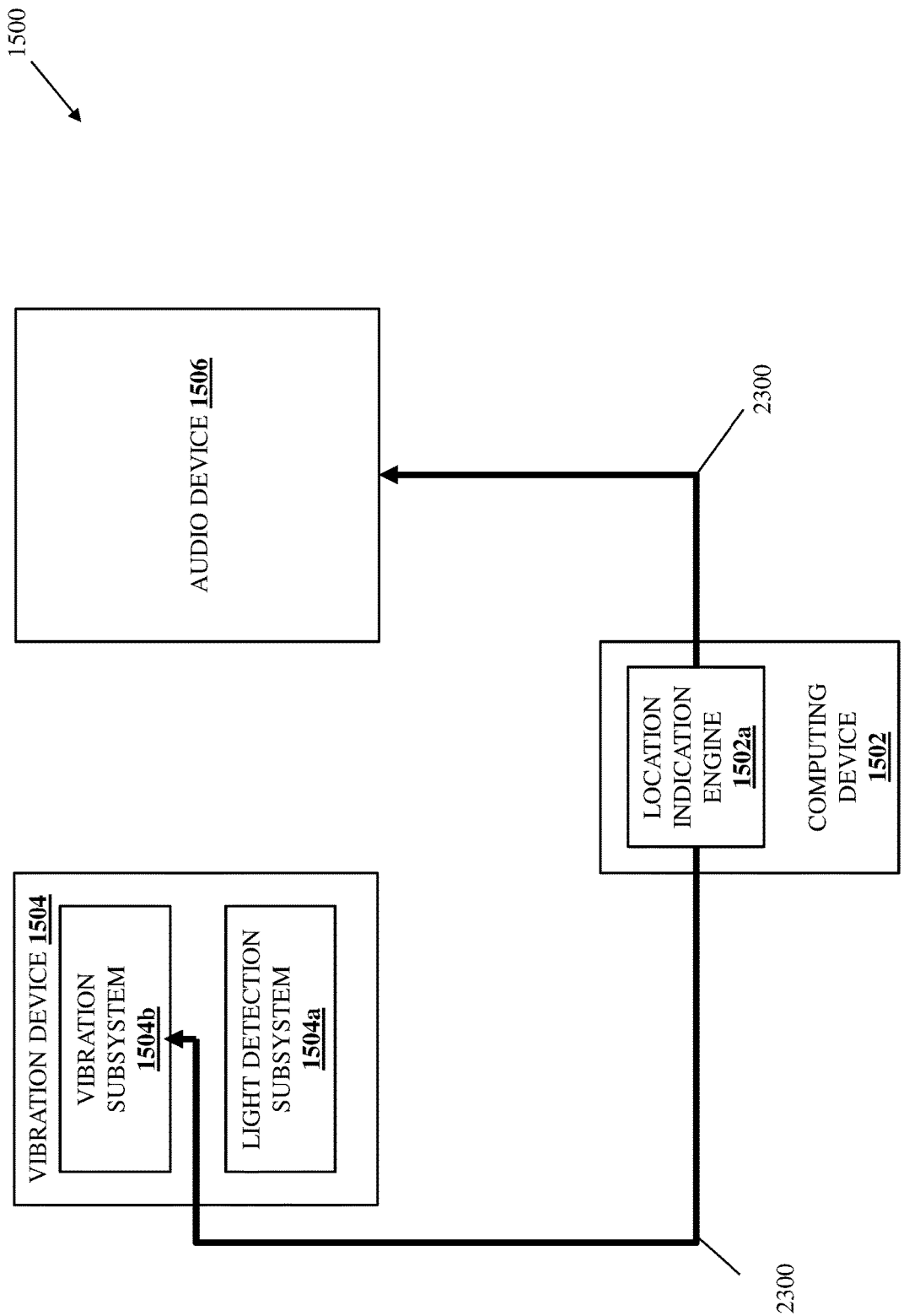
FIG. 23 is a schematic view illustrating an embodiment of the vibration-based location indication of FIG. 15 operating during the method of FIG. 17.

The method 1700 then proceeds to block 1708 where the vibration-based location indication system drives a vibration subsystem to produce vibration to indicate a location. With reference to FIG. 23, in response to determining that the light includes the locator signal, the location indication engine 1502*a* in the computing device 1502 may perform location indication instruction operations 2300 that may include transmitting a location indication instruction to the vibration subsystem 1504*b* that is configured to drive the vibration subsystem 1504*b* in order to cause it to vibrate, and transmitting a location indication instruction to the audio device 1506 that is configured to drive the audio device 1506 in order to cause it emit sound. As such, a user utilizing vibration-based location indication system 1500 may be provided with both a tactile vibration indication (e.g., via a handheld device, the gloves 1600/1602 discussed above, etc.) and an audio sound indication (e.g., via headphones) that are configured to indicate that the vibration device 1504 is adjacent a computing system and/or computing component that is emitting a light-based locator signal.

Figure 24A:
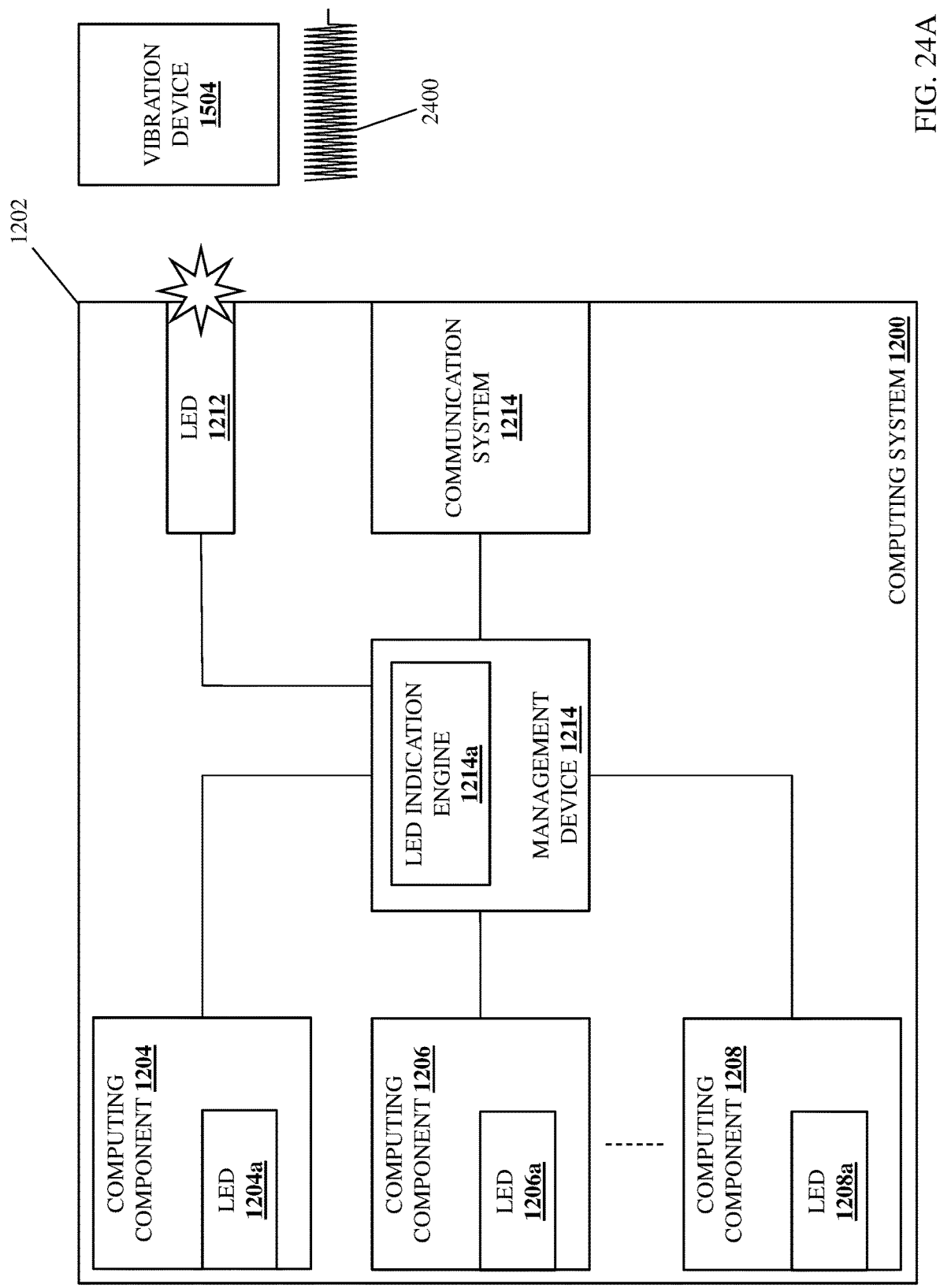
FIG. 24A is schematic view illustrating the vibration device of the vibration-based location indication system of FIG. 20A operating during the method of FIG. 17.
Figure 24B:
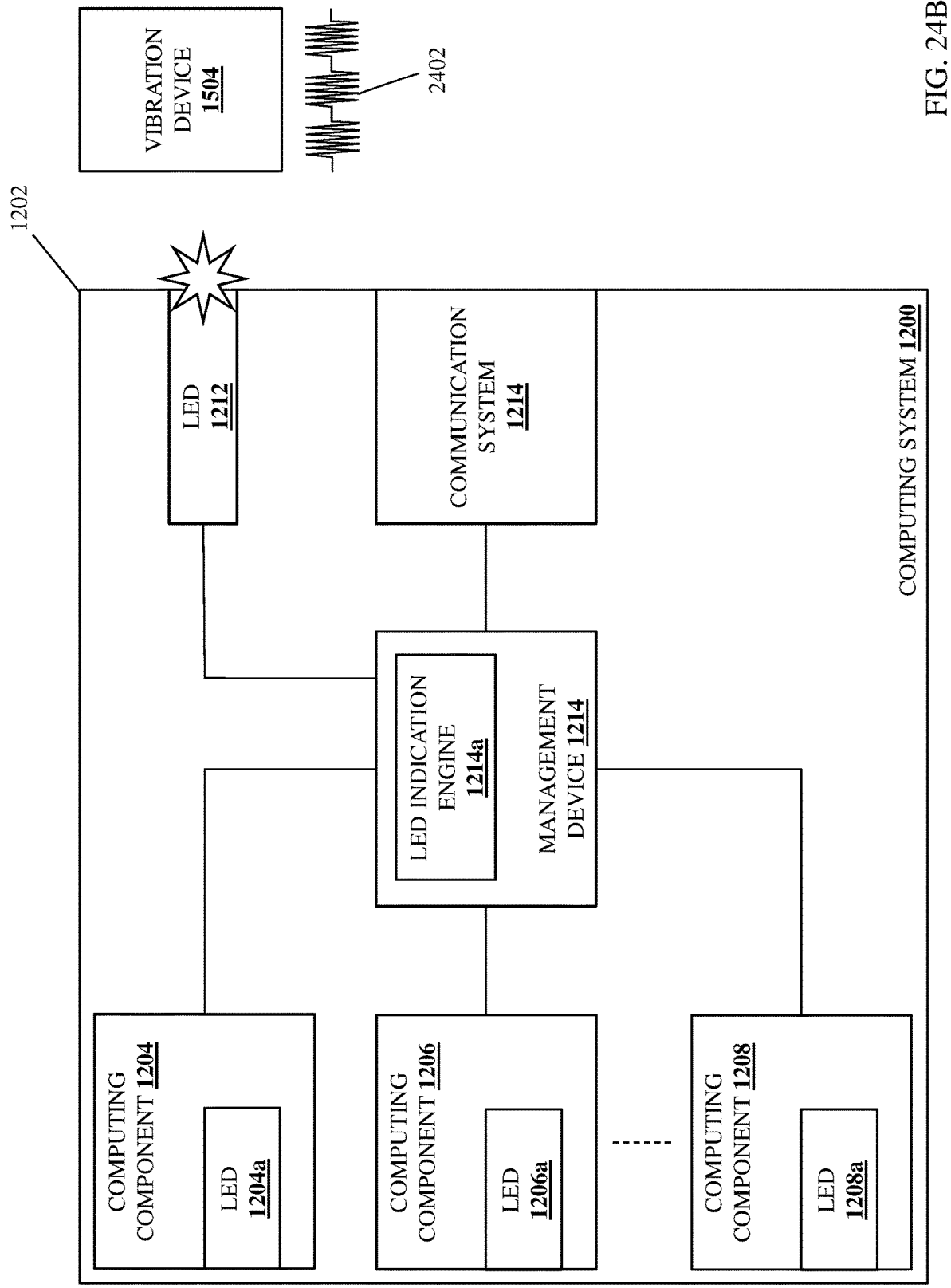
FIG. 24B is schematic view illustrating the vibration device of the vibration-based location indication system of FIG. 20A operating during the method of FIG. 17.

With reference to FIG. 24A, an embodiment of the vibration device 1504 producing vibrations 2400 to indicate a location of the computing system 1200 (e.g., a location adjacent the vibration device 1504) is illustrated, and one of skill in the art in possession of the present disclosure will appreciate how the vibration 2400 (e.g., a morse code "dash") may be configured to indicate to the user that the computing system 1200 is identifying itself via the locator signal. With reference to FIG. 24B, an embodiment of the vibration device 1504 producing vibrations 2402 to indicate a location of a computing component in the computing system 1200 (e.g., a location adjacent the vibration device 1504) is illustrated, and one of skill in the art in possession of the present disclosure will appreciate how the vibration 2402 (e.g., three "dots") may be configured to indicate to the user that the computing system 1200 is identifying one of its components via the locator signal. Furthermore, one of skill in the art in possession of the present disclosure will appreciate how the vibration 2402 may be configured to distinguish between different computing components 1204-1208 in the computing system 1200 (e.g., one "dot" for power supply units, two "dots" for storage devices, three "dots" for fan systems, etc.).

Figure 24C:
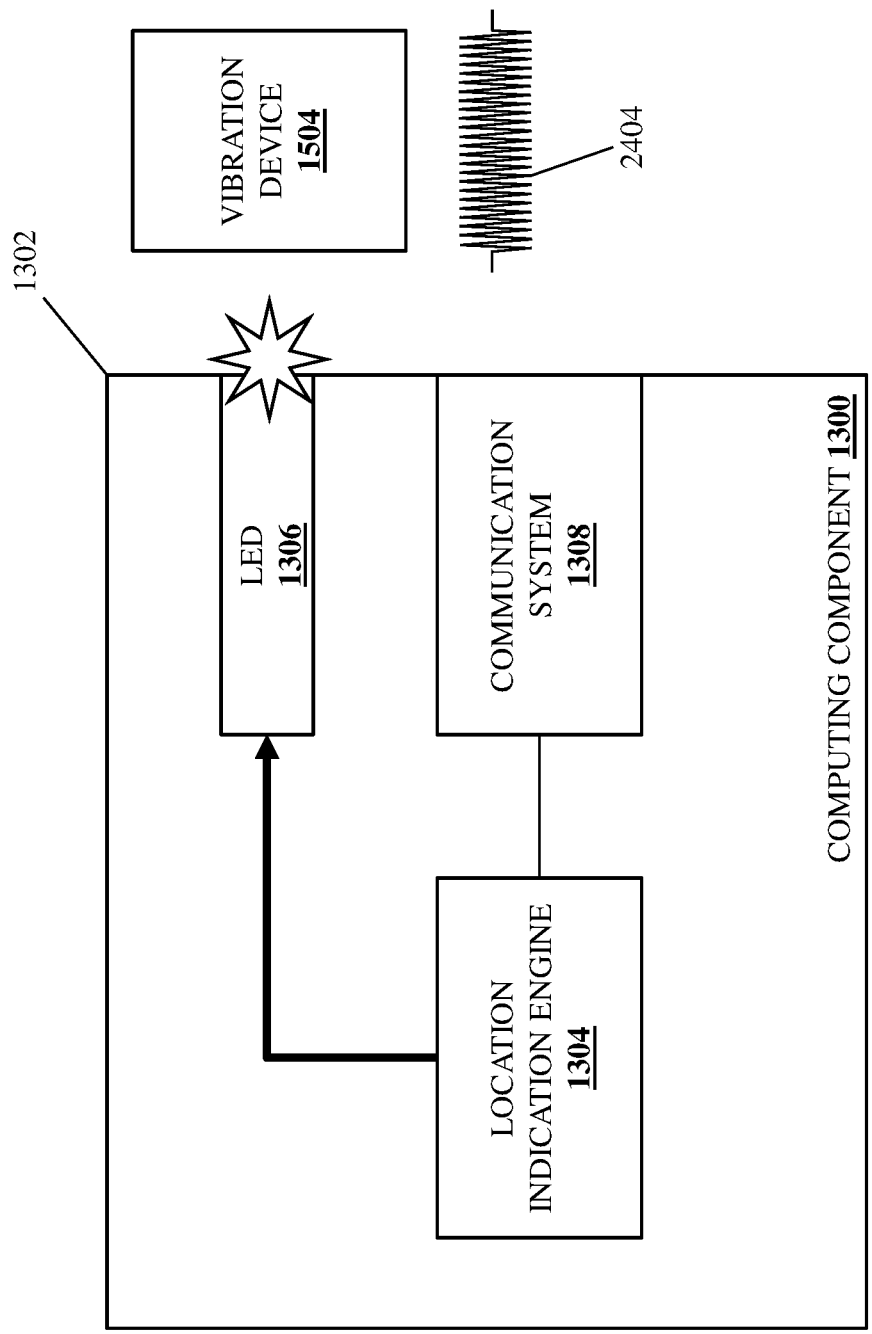
FIG. 24C is schematic view illustrating the vibration device of the vibration-based location indication system of FIG. 20B operating during the method of FIG. 17.
Figure 24D:
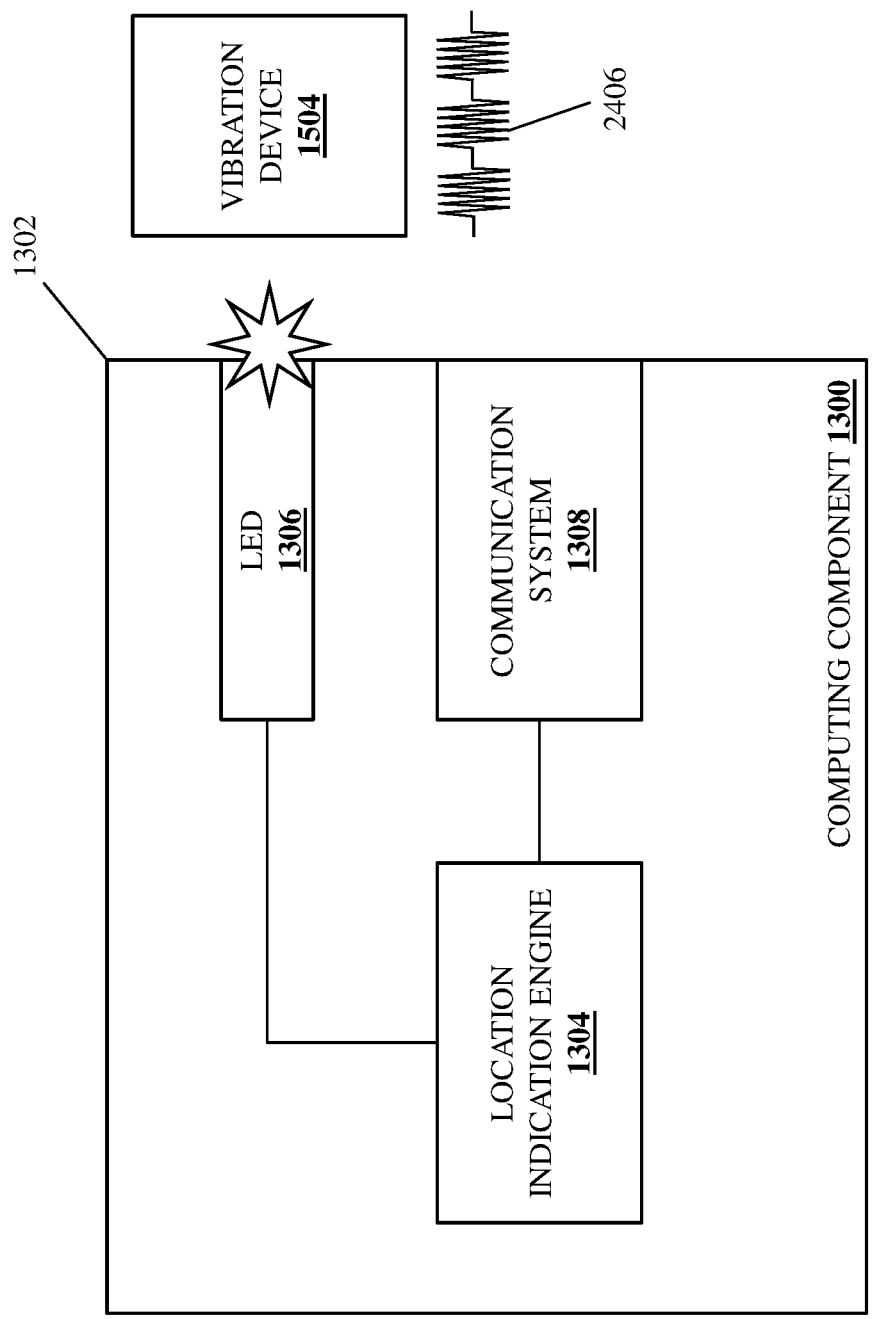
FIG. 24D is schematic view illustrating the vibration device of the vibration-based location indication system of FIG. 20B operating during the method of FIG. 17.

With reference to FIG. 24C, an embodiment of the vibration device 1504 producing vibrations 2404 to indicate a location of the computing component 1300 (e.g., a location adjacent the vibration device 1504) is illustrated, and one of skill in the art in possession of the present disclosure will appreciate how the vibration 2404 (e.g., a morse code "dash") may be configured to indicate to the user that the computing component 1300 is identifying itself via the locator signal. With reference to FIG. 24D, an embodiment of the vibration device 1504 producing vibrations 2406 to indicate information about the computing component 1300 (e.g., a type of fault) is illustrated, and one of skill in the art in possession of the present disclosure will appreciate how the vibration 2406 (e.g., three "dots") may be configured to indicate to the user that the computing component 1300 is identifying a specific fault via the locator signal.

Figure 25A:
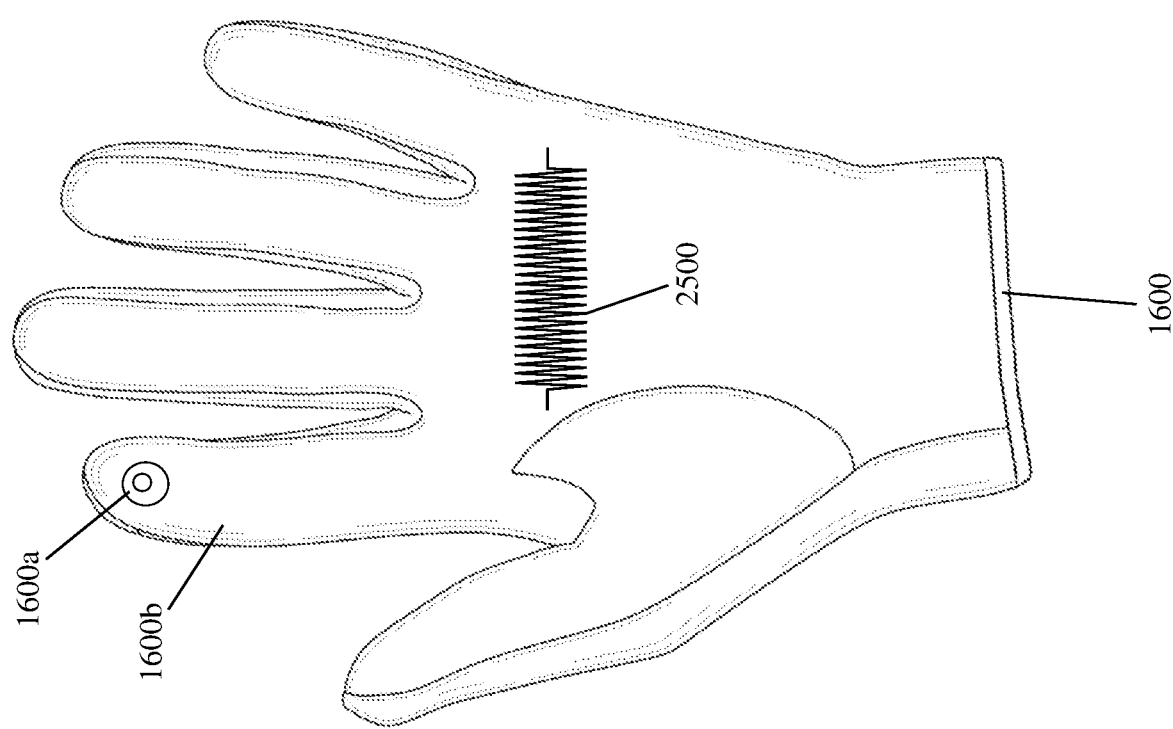
FIG. 25A is schematic view illustrating the vibration-based location indication system of FIG. 21B operating during the method of FIG. 17.
Figure 25B:
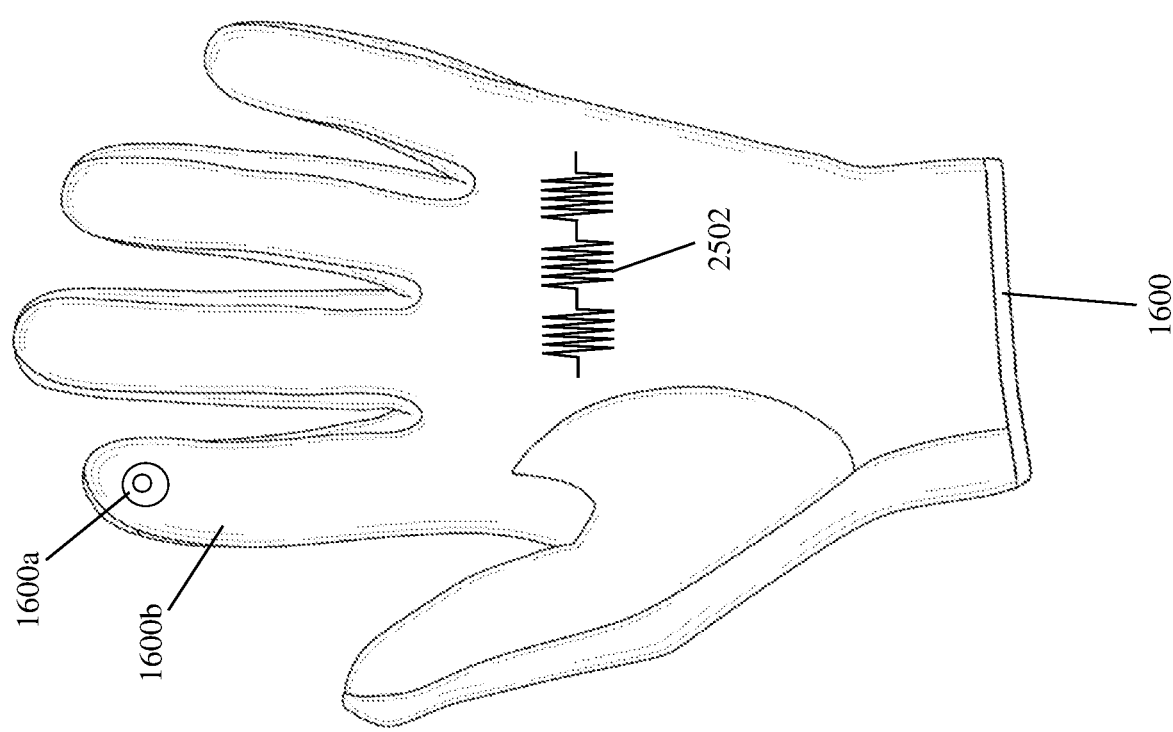
FIG. 25B is schematic view illustrating the vibration-based location indication system of FIG. 21B operating during the method of FIG. 17.

With reference to FIG. 25A, an embodiment of the glove 1600 producing vibrations 2500 to indicate a location of the computing system 1200 (e.g., a location adjacent the glove 1600) is illustrated, and one of skill in the art in possession of the present disclosure will appreciate how the vibration 2500 (e.g., a morse code "dash") may be configured to indicate to the user that the computing system 1200 is identifying itself via the locator signal. With reference to FIG. 25B, an embodiment of the glove 1600 producing vibrations 2502 to indicate a location of a computing component in the computing system 1200 (e.g., a location adjacent the glove 1600) is illustrated, and one of skill in the art in possession of the present disclosure will appreciate how the vibration 2052 (e.g., three "dots") may be configured to indicate to the user that the computing system 1200 is identifying one of its components via the locator signal. Furthermore, one of skill in the art in possession of the present disclosure will appreciate how the vibration 2502 may be configured to distinguish between different computing components 1204-1208 in the computing system 1200 (e.g., one "dot" for power supply units, two "dots" for storage devices, three "dots" for fan systems, etc.).

Thus, systems and methods have been described that detect a locator signal provided via light emitted by computing system or computing device and, in response, generate a vibration to identify the detection of that locator signal. For example, the computing system locating system of the present disclosure may include a computing system having a computing system light emitting device that is configured to emit light to provide a computing system locating signal, and a vibration-based location indication system. The vibration-based location indication system includes a light detection subsystem that is configured to detect the computing system locating signal via the light emitted from the computing system light emitting device on the computing system, and a vibration subsystem that is configured to vibrate. A location indication subsystem in the vibration-based location indication system that is coupled to the light detection subsystem and the vibration subsystem determines that the light detection subsystem has detected the computing system locating signal via the light emitted from the computing system light emitting device on the computing system and, in response, drives the vibration subsystem to produce a vibration to indicate the location of the computing system. As such, the issues with conventional visual location indications discussed above are remedied without a need to increase the costs of the computing systems or computing components being located, allowing blind or visually impaired datacenter technicians to locate computing systems and computing components in datacenters.

However, while the embodiments discussed above focus on the detection of visible light and corresponding production of vibrations that indicate the location of computing systems and/or computing components, other techniques for producing similar vibrations will fall within the scope of the present disclosure as well. For example, the vibrations discussed above may be produced in response to the detection of ultraviolet light and/or other non-visible light, or may be produced in response to any of a variety of wireless signals that would be apparent to one of skill in the art in possession of the present disclosure. Furthermore, a vibration-based location indication system provided according to the teachings of the present disclosure may replace the light detection subsystem discussed above with a camera and image recognition engines that are configured to capture images of computing systems and/or computing components in a datacenter, analyze those images to determine whether a computing system or computing component is of interest and, if so, produce the vibrations discussed above to indicate the location of the computing system or computing component.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computing system locating system, comprising:
a computing system that includes a computing system light emitting device that is configured to emit light to provide a computing system locating signal; and
a vibration-based location indication system that includes:
a light detection subsystem that is configured to detect the computing system locating signal via the light emitted from the computing system light emitting device included on the computing system;
a vibration subsystem that is configured to vibrate; and
a location indication subsystem that is coupled to the light detection subsystem and the vibration subsystem, wherein the location indication subsystem is configured to:
determine that the light detection subsystem has detected the computing system locating signal via the light emitted from the computing system light emitting device included on the computing system; and
drive, in response to determining that the light detection subsystem has detected the computing system locating signal, the vibration subsystem to produce a vibration that is configured to indicate the location of the computing system.

2. The system of claim 1, wherein the computing system includes:
a computing component that includes a computing component light emitting device that is configured to emit light to provide a computing component locating signal,
wherein the light detection subsystem is configured to detect the computing component locating signal via the light emitted from the computing component light emitting device included on the computing component, and
wherein the location indication subsystem is configured to:
determine that the light detection subsystem has detected the computing component locating signal via the light emitted from the computing component light emitting device included on the computing component; and
drive, in response to determining that the light detection subsystem has detected the computing component locating signal, the vibration subsystem to produce a vibration that is configured to indicate the location of the computing component.

3. The system of claim 1, wherein the vibration-based location indication system includes:
a glove that is configured to be worn on a hand and that includes the light detection subsystem on a finger portion of the glove.

4. The system of claim 3, wherein the light detection subsystem extends from the finger portion of the glove, and wherein the computing system light emitting device included on the computing system is located adjacent a light detection subsystem housing that is defined by the computing system and configured to house the light detection subsystem when the light detection subsystem detects the computing system locating signal via the light emitted from the computing system light emitting device.

5. The system of claim 3, wherein the vibration subsystem is included in the glove.

6. The system of claim 1, wherein the location indication subsystem is wirelessly coupled to the light detection subsystem and the vibration subsystem and is configured to wirelessly determine that the light detection subsystem has detected the computing system locating signal and wirelessly drive the vibration subsystem.

7. The system of claim 1, wherein the computing system light emitting device is configured to emit light to provide a computing component locating signal,
wherein the light detection subsystem is configured to detect the computing component locating signal via the light emitted from the computing system light emitting device included on the computing system, and
wherein the location indication subsystem is configured to:
determine that the light detection subsystem has detected the computing component locating signal via the light emitted from the computing system light emitting device included on the computing system; and
drive, in response to determining that the light detection subsystem has detected the computing component locating signal, the vibration subsystem to produce a vibration that is configured to indicate the location of the computing component.

8. A vibration-based location indication system, comprising:
a light detection subsystem that is configured to detect a computing system locating signal via light emitted from a computing system light emitting device included on a computing system;
a vibration subsystem that is configured to vibrate;
a processing system that is coupled to the light detection subsystem and the vibration subsystem; and
a memory system that is coupled to the processing system and that includes instructions that, when executed by the processing system, cause the processing system to provide a location indication engine that is configured to:
determine that the light detection subsystem has detected the computing system locating signal via the light emitted from the computing system light emitting device included on the computing system; and drive, in response to determining that the light detection subsystem has detected the computing system locating signal, the vibration subsystem to produce a vibration that is configured to indicate the location of the computing system.

9. The vibration-based location indication system of claim 8, wherein the light detection subsystem is configured to detect a computing component locating signal via light emitted from a computing component light emitting device included on a computing component, and
wherein the location indication engine is configured to:
determine that the light detection subsystem has detected the computing component locating signal via the light emitted from the computing component light emitting device included on the computing component; and
drive, in response to determining that the light detection subsystem has detected the computing component locating signal, the vibration subsystem to produce a vibration that is configured to indicate the location of the computing component.

10. The vibration-based location indication system of claim 8, further comprising:
a glove that is configured to be worn on a hand and that includes the light detection subsystem on a finger portion of the glove.

11. The vibration-based location indication system of claim 10, wherein the light detection subsystem extends from the finger portion of the glove and is configured to be housed in a light detection subsystem housing that is defined by the computing system adjacent the computing system light emitting device when the light detection subsystem detects the computing system locating signal via the light emitted from the computing system light emitting device.

12. The vibration-based location indication system of claim 10, wherein the vibration subsystem is included in the glove.

13. The vibration-based location indication system of claim 8, wherein the processing system is wirelessly coupled to the light detection subsystem and the vibration subsystem, and the location indication engine is configured to wirelessly determine that the light detection subsystem has detected the computing system locating signal and wirelessly drive the vibration subsystem.

14. A method for indicating a location of a computing system or computing device using vibrations, comprising:
detecting, by a vibration-based location indication system, first light emitted from a computing system light emitting device included on a computing system;
determining, by the vibration-based location indication system, that the first light emitted from the computing system light emitting device provides a computing system locator signal; and
driving, in response to determining that the first light emitted from the computing system light emitting device provides the computing system locator signal, a vibration subsystem to produce a vibration that is configured to indicate the location of the computing system.

15. The method of claim 14, further comprising:
detecting, by the vibration-based location indication system, light emitted from a computing component light emitting device included on a computing component;
determining, by the vibration-based location indication system, that the light emitted from the computing component light emitting device provides a computing component locator signal; and
driving, in response to determining that the light emitted from the computing component light emitting device provides the computing component locator signal, the vibration subsystem to produce a vibration that is configured to indicate the location of the computing component.

16. The method of claim 14, wherein the vibration-based location indication system includes a glove that is worn on a hand and that includes the light detection subsystem on a finger portion of the glove.

17. The method of claim 16, wherein the light detection subsystem extends from the finger portion of the glove and is housed in a light detection subsystem housing that is defined by the computing system adjacent the computing system light emitting device when the light detection subsystem detects the computing system locating signal via the light emitted from the computing system light emitting device.

18. The method of claim 16, wherein the vibration subsystem is included in the glove.

19. The method of claim 14, wherein the vibration-based location indication system wirelessly determines that the light detection subsystem has detected the computing system locating signal and wirelessly drives the vibration subsystem.

20. The method of claim 14, further comprising:
- detecting, by the vibration-based location indication system, second light emitted from the computing system light emitting device included on the computing system;
- determining, by the vibration-based location indication system, that the second light emitted from the computing system light emitting device provides a computing component locator signal; and
- driving, in response to determining that the second light emitted from the computing system light emitting device provides the computing component locator signal, the vibration subsystem to produce a vibration that is configured to indicate the location of the computing component.

\* \* \* \* \*